(12) United States Patent
Sun et al.

(10) Patent No.: US 10,846,765 B2
(45) Date of Patent: Nov. 24, 2020

(54) BLOCKCHAIN-BASED E-BILL NUMBER APPLICATION METHOD, APPARATUS, AND ELECTRONIC DEVICE

(71) Applicant: Advanced New Technologies Co., Ltd., George Town (KY)

(72) Inventors: Zhen Sun, Hangzhou (CN); Longsheng Qing, Hangzhou (CN); Xueqing Yang, Hangzhou (CN); Ge Jin, Hangzhou (CN); Zhenzhong Meng, Hangzhou (CN); Yu Chu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,198

(22) Filed: Jan. 31, 2020

(65) Prior Publication Data
US 2020/0167840 A1 May 28, 2020

Related U.S. Application Data

(63) Continuation of application No. PCT/CN2020/072141, filed on Jan. 15, 2020.

(30) Foreign Application Priority Data

Jul. 31, 2019 (CN) .......................... 2019 1 0703797

(51) Int. Cl.
  *G06Q 30/04* (2012.01)
  *G06Q 20/10* (2012.01)
  *H04L 9/06* (2006.01)

(52) U.S. Cl.
  CPC .......... *G06Q 30/04* (2013.01); *G06Q 20/102* (2013.01); *H04L 9/0643* (2013.01);
  (Continued)

(58) Field of Classification Search
  CPC ............ H04L 2209/38; H04L 2209/56; G06Q 2220/00
  See application file for complete search history.

(56) References Cited

U.S. PATENT DOCUMENTS

| 5,892,900 A | 4/1999 | Ginter et al. |
| 2003/0126048 A1 | 7/2003 | Hollar et al. |
| (Continued) | | |

FOREIGN PATENT DOCUMENTS

| CN | 107358420 A | * 11/2017 |
| CN | 108961030 | 12/2018 |
| (Continued) | | |

OTHER PUBLICATIONS

U.S. Appl. No. 16/779,173, Jin et al., filed Jan. 31, 2020.
(Continued)

*Primary Examiner* — A. Hunter Wilder
(74) *Attorney, Agent, or Firm* — Fish & Richardson P.C.

(57) ABSTRACT

A computer-implemented method, non-transitory, computer-readable medium, and computer-implemented system are provided for applying a blockchain-based e-bill number. A blockchain includes multiple levels of accounts used to maintain e-bill number segments. An e-bill number application transaction published to the blockchain is received, where the e-bill number application transaction includes an account identifier of an account of a number applicant; allocating one or more e-bill numbers to the number applicant from an e-bill number segment maintained in an upper-level account corresponding to the account of the number applicant in response to the e-bill number application transaction; and adding the one or more e-bill numbers allocated to the number applicant to the account of the number applicant for maintenance.

15 Claims, 12 Drawing Sheets

(52) U.S. Cl.
CPC ...... *G06Q 2220/00* (2013.01); *H04L 2209/38* (2013.01); *H04L 2209/56* (2013.01)

(56) References Cited

U.S. PATENT DOCUMENTS

| | | | |
|---|---|---|---|
| 2004/0088255 | A1 | 5/2004 | Zielke et al. |
| 2008/0040265 | A1 | 2/2008 | Rackley, III et al. |
| 2010/0030675 | A1 | 2/2010 | Hanan et al. |
| 2013/0138570 | A1 | 5/2013 | Ross |
| 2017/0004550 | A1 | 1/2017 | Shaaban et al. |
| 2017/0236104 | A1* | 8/2017 | Biton .................. H04L 9/30 705/64 |
| 2018/0075536 | A1* | 3/2018 | Jayaram ............... G06Q 20/223 |
| 2018/0189755 | A1 | 7/2018 | Kilpatrick et al. |
| 2019/0080284 | A1* | 3/2019 | Kim .................. G06Q 10/0833 |
| 2019/0130399 | A1 | 5/2019 | Wright et al. |
| 2019/0205884 | A1 | 7/2019 | Batra et al. |
| 2020/0042960 | A1 | 2/2020 | Cook et al. |
| 2020/0143337 | A1* | 5/2020 | Conroy ................. H04L 9/0861 |
| 2020/0175526 | A1 | 6/2020 | Yang et al. |

FOREIGN PATENT DOCUMENTS

| | | |
|---|---|---|
| CN | 109146583 | 1/2019 |
| CN | 109191219 | 1/2019 |
| CN | 109636492 | 4/2019 |
| CN | 109949108 | 6/2019 |
| CN | 109949111 | 6/2019 |
| CN | 110046944 | 7/2019 |
| CN | 110046945 | 7/2019 |
| CN | 110046999 | 7/2019 |
| CN | 110060096 | 7/2019 |
| CN | 110458677 | 11/2019 |
| CN | 110473030 | 11/2019 |
| WO | WO 0186558 | 11/2001 |

OTHER PUBLICATIONS

U.S. Appl. No. 16/779,511, Yang et al., filed Jan. 31, 2020.
U.S. Appl. No. 16/783,075, Yang et al., filed Feb. 5, 2020.
U.S. Appl. No. 16/783,094, Qing, filed Feb. 5, 2020.
U.S. Appl. No. 16/783,098, Meng et al., filed Feb. 5, 2020.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/072141, dated Apr. 24, 2020, 19 pages (with machine translation).
PCT International Search Report and Written Opinion in International Application No. PCT/CN2020/072136, dated Apr. 24, 2020, 21 pages (with machine translation).

\* cited by examiner

US 10,846,765 B2

BLOCKCHAIN-BASED E-BILL NUMBER APPLICATION METHOD, APPARATUS, AND ELECTRONIC DEVICE

CROSS-REFERENCE TO RELATED APPLICATIONS

This application is a continuation of PCT Application No. PCT/CN2020/072141, filed on Jan. 15, 2020, which claims priority to Chinese Patent Application No. 201910703797.4, filed on Jul. 31, 2019, and each application is hereby incorporated by reference in its entirety.

TECHNICAL FIELD

One or more implementations of the present specification relate to the field of blockchain technologies, and in particular, to a blockchain-based e-bill number application method, apparatus, and electronic device.

BACKGROUND

The blockchain technology is also referred to as a distributed ledger technology, and is an emerging technology in which several computing devices jointly participate in "accounting" and jointly maintain a complete distributed database. The blockchain technology has been widely used in many fields because the blockchain technology features in decentralization, openness, and transparency, and each computing device can participate in database recording and quickly perform data synchronization.

SUMMARY

The present specification provides a blockchain-based e-bill number application method, where the method is applied to a node device in the blockchain, the blockchain includes multiple levels of accounts used to maintain e-bill number segments, and the method includes: receiving a number application transaction published to the blockchain, where the number application transaction includes an account identifier of an account of a number applicant; allocating e-bill numbers to the number applicant from an e-bill number segment maintained in an upper-level account corresponding to the account of the number applicant in response to the number application transaction; and adding the e-bill numbers allocated to the number applicant to the account of the number applicant for maintenance.

Optionally, the allocating e-bill numbers to the number applicant from an e-bill number segment maintained in an upper-level account corresponding to the account of the number applicant in response to the number application transaction includes: invoking a smart contract deployed on the blockchain in response to the number application transaction, to allocate the e-bill numbers to the number applicant from the e-bill number segment maintained in the upper-level account corresponding to the account of the number applicant.

Optionally, the allocating e-bill numbers to the number applicant from an e-bill number segment maintained in an upper-level account corresponding to the account of the number applicant includes: determining whether a quantity corresponding to the e-bill number segment maintained in the upper-level account corresponding to the account of the number applicant is sufficient; and if the quantity corresponding to the e-bill number segment maintained in the upper-level account is sufficient, allocating the e-bill numbers to the number applicant from the e-bill number segment maintained in the upper-level account.

Optionally, the method further includes: if the quantity corresponding to the e-bill number segment maintained in the upper-level account is insufficient, sending an alarm indication to a client corresponding to the upper-level account, to instruct the client to construct a number application transaction and publish the number application transaction to the blockchain; or if the quantity corresponding to the e-bill number segment maintained in the upper-level account is insufficient, generating event information that the quantity corresponding to the e-bill number segment maintained in the upper-level account is insufficient, and publishing the event information to the blockchain for storage, so that when detecting the event information through listening, a client corresponding to the upper-level account constructs a number application transaction and publishes the number application transaction to the blockchain.

Optionally, the method further includes: periodically determining whether a quantity of an e-bill number segment maintained in each level of account in the multiple levels of accounts is sufficient; and if a quantity corresponding to an e-bill number segment maintained in any level of target account in the multiple levels of accounts is insufficient, sending an alarm indication to a client corresponding to the target account, to instruct the client to construct a number application transaction and publish the number application transaction to the blockchain.

The present specification further provides a blockchain-based billing method, where the method is applied to a node device in the blockchain, the blockchain includes multiple levels of accounts used to maintain e-bill number segments, and the method includes: receiving a billing transaction published to the blockchain, where the billing transaction includes billing information and an account identifier of an account of a biller; invoking a smart contract deployed on the blockchain in response to the billing transaction, to determine whether a quantity corresponding to an e-bill number segment maintained in the account of the biller is sufficient; and if the quantity corresponding to the e-bill number segment maintained in the account of the biller is insufficient, allocating e-bill numbers to the biller from an e-bill number segment maintained in an upper-level account corresponding to the account of the biller, and adding the e-bill numbers allocated to the biller to the account of the biller for maintenance; and allocating a target e-bill number to the biller from the e-bill numbers allocated to the account of the biller, and creating an e-bill based on the target e-bill number and the billing information.

Optionally, the method further includes: if the quantity corresponding to the e-bill number segment maintained in the account of the biller is sufficient, allocating a target e-bill number to the biller from the e-bill number segment maintained in the account of the biller, and creating an e-bill based on the target e-bill number and the billing information.

Optionally, the allocating e-bill numbers to the biller from an e-bill number segment maintained in an upper-level account corresponding to the account of the biller includes: determining whether a quantity corresponding to the e-bill number segment maintained in the upper-level account corresponding to the account of the biller is sufficient; and if the quantity corresponding to the e-bill number segment maintained in the upper-level account is sufficient, allocating the e-bill numbers to the biller from the e-bill number segment maintained in the upper-level account.

Optionally, the method further includes: if the quantity corresponding to the e-bill number segment maintained in the upper-level account is insufficient, sending an alarm indication to a client corresponding to the upper-level account, to instruct the client to construct a number application transaction and publish the number application transaction to the blockchain; or if the quantity corresponding to the e-bill number segment maintained in the upper-level account is insufficient, generating event information that the quantity corresponding to the e-bill number segment maintained in the upper-level account is insufficient, and publishing the event information to the blockchain for storage, so that when detecting the event information through listening, a client corresponding to the upper-level account constructs a number application transaction and publishes the number application transaction to the blockchain.

The present specification further provides a blockchain-based e-bill number application apparatus, where the apparatus is applied to a node device in the blockchain, the blockchain includes multiple levels of accounts used to maintain e-bill number segments, and the apparatus includes: a receiving module, configured to receive a number application transaction published to the blockchain, where the number application transaction includes an account identifier of an account of a number applicant; an allocation module, configured to allocate e-bill numbers to the number applicant from an e-bill number segment maintained in an upper-level account corresponding to the account of the number applicant in response to the number application transaction; and a maintenance module, configured to add the e-bill numbers allocated to the number applicant to the account of the number applicant for maintenance.

Optionally, the allocation module is configured to: invoke a smart contract deployed on the blockchain in response to the number application transaction, to allocate the e-bill numbers to the number applicant from the e-bill number segment maintained in the upper-level account corresponding to the account of the number applicant.

Optionally, the allocation module is configured to: determine whether a quantity corresponding to the e-bill number segment maintained in the upper-level account corresponding to the account of the number applicant is sufficient; and if the quantity corresponding to the e-bill number segment maintained in the upper-level account is sufficient, allocate the e-bill numbers to the number applicant from the e-bill number segment maintained in the upper-level account.

Optionally, the apparatus further includes: a first indication module, configured to: if the quantity corresponding to the e-bill number segment maintained in the upper-level account is insufficient, send an alarm indication to a client corresponding to the upper-level account, to instruct the client to construct a number application transaction and publish the number application transaction to the blockchain; or if the quantity corresponding to the e-bill number segment maintained in the upper-level account is insufficient, generate event information that the quantity corresponding to the e-bill number segment maintained in the upper-level account is insufficient, and publish the event information to the blockchain for storage, so that when detecting the event information through listening, a client corresponding to the upper-level account constructs a number application transaction and publishes the number application transaction to the blockchain.

Optionally, the apparatus further includes: a determining module, configured to periodically determine whether a quantity corresponding to an e-bill number segment maintained in each level of account in the multiple levels of accounts is sufficient; and a second indication module, configured to: if a quantity corresponding to an e-bill number segment maintained in any level of target account in the multiple levels of accounts is insufficient, send an alarm indication to a client corresponding to the target account, to instruct the client to construct a number application transaction and publish the number application transaction to the blockchain.

The present specification further provides a blockchain-based billing apparatus, where the apparatus is applied to a node device in the blockchain, the blockchain includes multiple levels of accounts used to maintain e-bill number segments, and the apparatus includes: a receiving module, configured to receive a billing transaction published to the blockchain, where the billing transaction includes billing information and an account identifier of an account of a biller; a determining module, configured to invoke a smart contract deployed on the blockchain in response to the billing transaction, to determine whether a quantity corresponding to an e-bill number segment maintained in the account of the biller is sufficient; and a first billing module, configured to: if the quantity corresponding to the e-bill number segment maintained in the account of the biller is insufficient, allocate e-bill numbers to the biller from an e-bill number segment maintained in an upper-level account corresponding to the account of the biller, and add the e-bill numbers allocated to the biller to the account of the biller for maintenance; and allocate a target e-bill number to the biller from the e-bill numbers allocated to the account of the biller, and create an e-bill based on the target e-bill number and the billing information.

Optionally, the apparatus further includes: a second billing module, configured to: if the quantity corresponding to the e-bill number segment maintained in the account of the biller is sufficient, allocate a target e-bill number to the biller from the e-bill number segment maintained in the account of the biller, and create an e-bill based on the target e-bill number and the billing information.

Optionally, the first billing module is configured to: determine whether a quantity corresponding to the e-bill number segment maintained in the upper-level account corresponding to the account of the biller is sufficient; and if the quantity corresponding to the e-bill number segment maintained in the upper-level account is sufficient, allocate the e-bill numbers to the biller from the e-bill number segment maintained in the upper-level account.

Optionally, the apparatus further includes: an indication module, configured to: if the quantity corresponding to the e-bill number segment maintained in the upper-level account is insufficient, send an alarm indication to a client corresponding to the upper-level account, to instruct the client to construct a number application transaction and publish the number application transaction to the blockchain; or if the quantity corresponding to the e-bill number segment maintained in the upper-level account is insufficient, generate event information that the quantity corresponding to the e-bill number segment maintained in the upper-level account is insufficient, and publish the event information to the blockchain for storage, so that when detecting the event information through listening, a client corresponding to the upper-level account constructs a number application transaction and publishes the number application transaction to the blockchain.

The present specification further provides an electronic device, including: a processor; and a memory, configured to store a processor-executable instruction, where the processor runs the executable instruction to implement the steps of the previous method.

The present specification further provides a computer-readable storage medium, where the computer-readable storage medium stores a computer instruction, and the steps of the previous method are implemented when the instruction is executed by a processor.

In the previous technical solutions, an account manager of any level of account in the blockchain can be used as a number applicant to actively apply for e-bill numbers from an e-bill number segment maintained in an upper-level account corresponding to the account of the number applicant. Alternatively, when it is determined that a quantity corresponding to an e-bill number segment maintained in an account of a biller that performs billing processing based on the blockchain is insufficient, e-bill numbers are applied for from an e-bill number segment maintained in an upper-level account corresponding to the account of the biller. As such, automatic application can be implemented for an e-bill number segment maintained in each level of account, to alleviate the problem that a quantity corresponding to the e-bill number segment maintained in each level of account in the blockchain is insufficient.

DESCRIPTION OF IMPLEMENTATIONS

Figure 1:
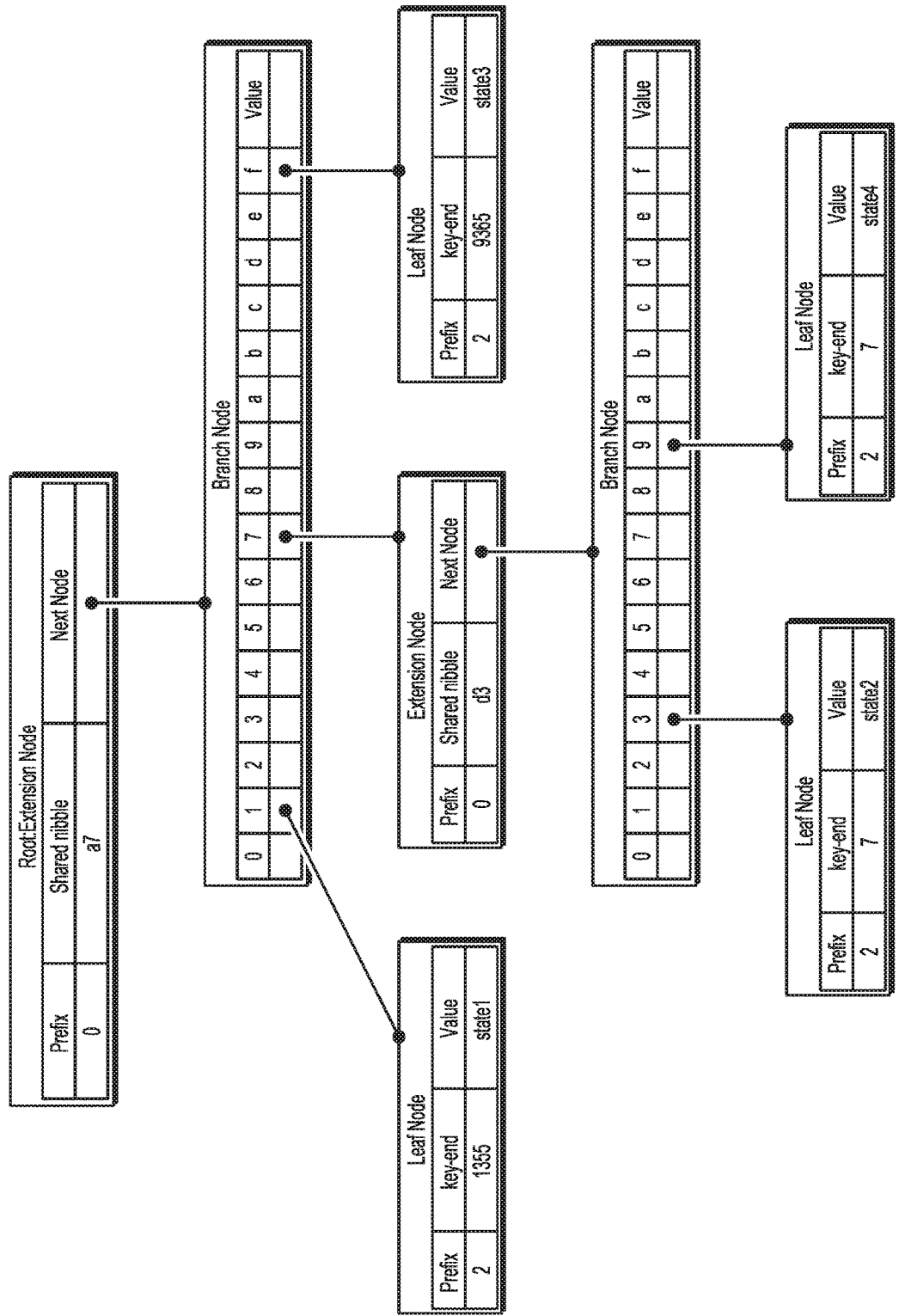
FIG. 1 is a schematic diagram illustrating organizing account state data of a blockchain into an MPT state tree, according to the present specification.

Example implementations are described in detail here, and examples of the implementations are presented in the accompanying drawings. When the following description relates to the accompanying drawings, unless specified otherwise, same numbers in different accompanying drawings represent same or similar elements. The implementations described in the following example implementations do not represent all implementations consistent with one or more implementations of the present specification. On the contrary, the implementations are only examples of apparatuses and methods that are described in the appended claims in detail and consistent with some aspects of the one or more implementations of the present specification.

It is worthwhile to note that, in other implementations, steps of a corresponding method are not necessarily performed in a sequence shown and described in the present specification. In some other implementations, the method can include more or fewer steps than those described in the present specification. In addition, a single step described in the present specification may be divided into multiple steps in other implementations for description, and multiple steps described in the present specification may be combined into a single step for description in other implementations.

Blockchains are generally classified into three types: a public chain (Public Blockchain), a private chain (Private Blockchain), and a consortium chain (Consortium Blockchain). In addition, there can be combinations of the previous multiple types, such as a combination of a private chain and a consortium chain and a combination of a consortium chain and a public chain.

The public chain has the highest degree of de-centralization. The public chain is represented by Bitcoin and Ethereum. Participants (which can also be referred to as blockchain nodes) in the public chain can read data records on the chain, participate in transactions, and contend for accounting permission of new blocks. In addition, each node can freely join or exit a network and perform a related operation.

On the contrary, in the private chain, write permission of the network is controlled by a certain organization or institution, and data read permission is specified by an organization. Briefly, the private chain can be a weakly centralized system, and the private chain has a strict limitation on nodes and has fewer nodes. This type of blockchain is more suitable for use inside a specific institution.

The consortium chain is a blockchain between the public chain and the private chain, and can be "partially decentralized". Each node in the consortium chain usually has an entity institution or organization corresponding to the node, and nodes join the network through authorization and form an interest-related consortium to jointly maintain blockchain operation.

Based on the basic features of the blockchain, the blockchain usually consists of several blocks. Timestamps corresponding to creation moments of the blocks are separately recorded in the blocks, and all the blocks form a time-ordered data chain strictly based on the timestamps recorded in the blocks.

Real data generated by the physical world can be constructed as a standard transaction format supported by the blockchain, and then published to the blockchain. Node devices in the blockchain perform consensus processing on a received transaction. After a consensus is reached, a node device used as an accounting node in the blockchain packs the transaction into a block for persistent storage in the blockchain.

Consensus algorithms supported by the blockchain can include a first type of consensus algorithm and a second type of consensus algorithm.

In the first type of consensus algorithm, node devices need to contend for accounting permission of each accounting period. For example, the first type of consensus algorithm is Proof of Work (POW), Proof of Stake (POS), or Delegated Proof of Stake (DPOS).

In the second type of consensus algorithm, an accounting node is selected in advance for each accounting period (without a need to contend for accounting permission). For example, the second type of consensus algorithm is Practical Byzantine Fault Tolerance (PBFT).

In a blockchain network using the first type of consensus algorithm, node devices that contend for accounting permission all can execute a transaction after receiving the transaction. One of the node devices that contend for accounting permission can win in the current round of accounting permission contention, and become an accounting node. The accounting node can pack a received transaction with other transactions to generate the latest block, and send the generated latest block or a block header of the latest block to other node devices for consensus.

In a blockchain network using the second type of consensus algorithm, a node device having accounting permission has been determined through negotiation before the current round of accounting. Therefore, after a node device receives a transaction, the node device can send the transaction to the accounting node if the node device is not the accounting node of the current round. The accounting node of the current round can execute the transaction when or before packing the transaction with other transactions to generate the latest block. After generating the latest block, the accounting node can send the generated latest block or a block header of the latest block to other node devices for consensus.

As described above, regardless of which type of consensus algorithm shown above is used in the blockchain, the accounting node of the current round can pack a received transaction to generate the latest block, and send the generated latest block or a block header of the latest block to other node devices for consensus check. After the other node devices receive the latest block or the block header of the latest block, if the other node devices determine, through check, that there is no problem on the latest block or the block header of the latest block, the latest block can be appended to the original blockchain to complete an accounting process of the blockchain. When checking a new block or block header sent by the accounting node, the other nodes can also execute a transaction included in the block.

In the blockchain field, an important concept is account. For example, for Ethereum, accounts are usually classified into two types: an external account and a contract account. The external account is an account directly controlled by a user and is also referred to as a user account. The contract account is created by a user by using an external account and is an account including contract code (that is, a smart contract). Certainly, for some blockchain projects (such as an ant blockchain) derived from the Ethereum architecture, account types supported by the blockchains can be further extended. Implementations are not specially limited in the present specification.

For an account in the blockchain, an account state of the account is usually maintained by using a structure. When a transaction in a block is executed, a state of an account associated with the transaction in the blockchain usually also changes.

For example, for Ethereum, a structure of an account usually includes a balance field, a nonce field, a code field, a storage field, etc.

The balance field is used to maintain a current account balance of the account.

The nonce field is used to maintain a quantity of transactions of the account, and the field is a counter used to ensure that each transaction can be processed only once, to effectively avoid a replay attack.

The code field is used to maintain contract code of the account. In practice, the code field generally maintains only a hash value of the contract code. Therefore, the code field is usually also referred to as Codehash field.

The storage field is used to maintain storage content of the account (a default field value is null). For a contract account, independent storage space is usually allocated to store storage content of the contract account. The independent storage space is usually referred to as account storage of the contract account. The storage content of the contract account is usually stored in the independent storage space by being constructed as a data structure of a Merkle Patricia Trie (MPT) tree. The MPT tree constructed based on the storage content of the contract account is usually also referred to as a storage tree. The storage field usually only maintains a root node of the storage tree. Therefore, the storage field is usually also referred to as StorageRoot field.

For an external account, field values of the code field and the storage field shown above are both null.

For most blockchain projects, the Merkle tree or a data structure based on the Merkle tree is usually used to store and maintain data. For example, for Ethereum, an MPT tree (a variant of the Merkle tree) is used as a data organization form to organize and manage important data such as an account state and transaction information.

For Ethereum, the following three MPT trees are designed for data that needs to be stored and maintained in the blockchain: an MPT state tree, an MPT transaction tree, and an MPT receipt tree. In addition to the three MPT trees, there is actually a storage tree constructed based on storage content of a contract account.

The MPT state tree is an MPT tree consisting of account state data of all accounts in the blockchain. The MPT transaction tree is an MPT tree consisting of transaction data in the blockchain. The MPT receipt tree is an MPT tree consisting of transaction receipts corresponding to transactions in blocks that are generated after the transactions are executed. Hash values of root nodes of the MPT state tree, the MPT transaction tree, and the MPT receipt tree are all finally added to a block header of a corresponding block.

Both the MPT transaction tree and the MPT receipt tree correspond to a block, that is, each block has its own MPT transaction tree and MPT receipt tree. The MPT state tree is a global MPT tree, and does not correspond to a specific block, but covers the account state data of all the accounts in the blockchain.

The organized MPT transaction tree, MPT receipt tree, and MPT state tree are all finally stored in a key-value type database (for example, LevelDB) that uses a multi-level data storage structure.

The previously described database that uses the multi-level data storage structure can be divided into n levels of data storage. For example, the n levels of data storage can be sequentially set to L0, L1, L2, L3, . . . , and L(n−1). For then levels of data storage in the database, a smaller level number usually indicates a higher level. For example, L0 stores data of the latest several blocks, L1 stores data of the second latest several blocks, and so on.

Storage media corresponding to the n levels of data storage usually can differ in read/write performance. For example, read/write performance of a storage medium corresponding to data storage at a high level (that is, with a smaller level number) can be higher than read/write performance of a storage medium corresponding to data storage at a low level. In practice, a storage medium with higher storage costs and better storage performance can be used for data storage at a high level, and a storage medium with lower unit costs and a larger capacity can be used for data storage at a low level.

In practice, as a block number (also referred to as a block height) of the blockchain increases, data stored in the database includes a lot of historical data. In addition, data in a block with a smaller block number is older and less important. Therefore, to reduce overall storage costs, data of different block heights usually can be "treated differently". For example, data in a block with a smaller block number can be stored on a storage medium with lower costs, and data in a block with a larger block number is stored in a storage medium with higher costs.

It is worthwhile to note that, each time a latest block is generated in the blockchain, after a transaction in the latest block is executed, account states of related accounts (which can be external accounts or contract accounts) on which the transaction is executed in the blockchain usually change accordingly.

For example, when a "transfer transaction" in a block is executed, balances of a transferor account and a transferee account associated with the "transfer transaction" (that is, field values of balance fields of these accounts) usually change accordingly.

After a transaction in the latest block generated in the blockchain is executed, because account states in the current blockchain change, node devices need to construct an MPT state tree based on current account state data of all the accounts in the blockchain, to maintain the latest states of all the accounts in the blockchain.

That is, each time a latest block is generated in the blockchain, after a transaction in the latest block is executed, account states in the blockchain change. In this case, the node devices need to construct a new MPT state tree based on the latest account state data of all the accounts in the blockchain. In other words, each block in the blockchain has a corresponding MPT state tree. The MPT state tree maintains the latest account states of all the accounts in the blockchain after a transaction in the block is executed.

FIG. 1 is a schematic diagram illustrating organizing account state data of a blockchain into an MPT state tree, according to the present specification.

The MPT tree is a modified Merkle tree variant, and the MPT tree incorporates advantages of the Merkle tree and the Trie dictionary tree (also referred to as a prefix tree).

The MPT tree generally includes three types of data nodes: a leaf node, an extension node, and a branch node.

The leaf node is a key-value pair represented as [key, value], where key is a special hexadecimal code character, and value is state data (that is, the structure shown above) of an account address corresponding to the leaf node. The extension node is also a key-value pair represented as [key, value], where key is also a special hexadecimal code character, but value is a hash value (hash index) of another node, that is, another node can be linked to by using a hash index.

The branch node includes 17 elements, and the first 16 elements correspond to 16 possible hexadecimal characters in key, where one character corresponds to one nibble. If a [key, value] pair terminates at the branch node, the branch node can act as a leaf node, and the last element represents value of the leaf node. Otherwise, the last element of the branch node can be null.

Characters on a search path from a root node to a leaf node in the MPT tree form a complete account address. Therefore, a branch node can be a terminate node of the search path, or can be an intermediate node of the search path.

Assume that account state data that needs to be organized into an MTP state tree is shown in Table 1:

TABLE 1

| Account address (Key) | | | | | | | Account state (Value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a character string consisting of hexadecimal characters. The account state is a structure formed by the previously described balance field, nonce field, code field, storage field, etc.

An MPT state tree finally organized based on the account state data in Table 1 is shown in FIG. 1, and the MPT state tree consists of four leaf nodes, two branch nodes, and two extension nodes.

In FIG. 1, both the extension node and the leaf node have a common prefix field. Different field values of the prefix field can be used to represent different node types.

For example, a value of the prefix field is 0, which indicates an extension node that includes an even quantity of nibbles. As mentioned above, the nibble includes four binary numbers, and one nibble can correspond to one character for forming an account address. A value of the prefix field is 1, which indicates an extension node that includes an odd quantity of nibble(s). A value of the prefix field is 2, which indicates a leaf node that includes an even quantity of nibbles. A value of the prefix field is 3, which indicates a leaf node that includes an odd quantity of nibble(s).

The branch node does not have the prefix field because the branch node is a prefix node parallel to a single nibble.

A shared nibble field in the extension node corresponds to key of a key-value pair included in the extension node, and indicates a common character prefix of account addresses. For example, all the account addresses in the previous table have a common character prefix a7. A next node field is padded with a hash value (hash index) of a next node.

Hexadecimal character 0 to f fields in the branch node correspond to key of a key-value pair included in the branch node. If the branch node is an intermediate node on a search path of an account address in the MPT tree, a value field of the branch node can be null. The 0 to f fields are used to be padded with a hash value of a next node.

A key-end field in the leaf node corresponds to key of a key-value pair included in the leaf node, and represents the last several characters of an account address. Keys of nodes on a search path from the root node to the leaf node form a complete account address. The value field of the leaf node is padded with account state data corresponding to the account address. For example, a structure obtained after the previously described structure consisting of the balance field, nonce field, code field, storage field, etc. is encoded can be padded in the value field of the leaf node.

Further, the node in the MPT state tree shown in FIG. 1 is also finally stored in a database in a form of a key-value pair.

When the node in the MPT state tree is stored in the database, key in a key-value pair of the node in the MPT state tree is a hash value of data content included in the node, and value in the key-value pair of the node in the MPT state tree is the data content included in the node.

That is, when the node in the MPT state tree is stored in the database, the hash value of the data content included in the node can be calculated (that is, hash calculation is performed on the entire node); and the calculated hash value is used as key and the data content included in the node is used as value, to generate a key-value pair. Then, the generated key-value pair is stored in the database.

Because the node in the MPT state tree is stored by using the hash value of the data content included in the node as key and using the data content included in the node as value, when the node in the MPT state tree needs to be queried, content addressing usually can be performed by using the hash value of the data content included in the node as key. With "content addressing", some nodes with "duplicate content" usually can be "reused", to save storage space of data storage.

Figure 2:
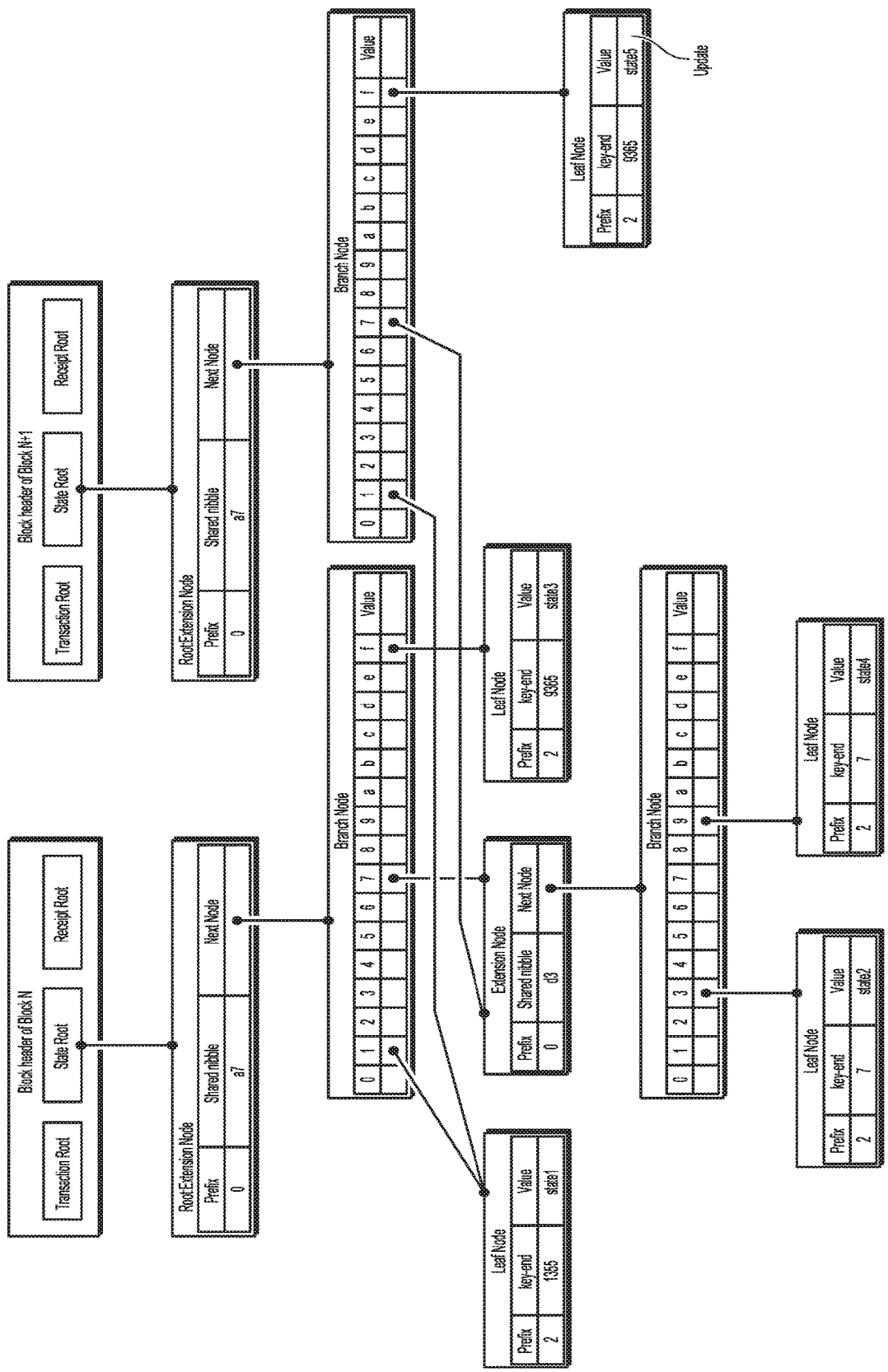
FIG. 2 is a schematic diagram illustrating node reusing in an MPT state tree, according to the present specification.

FIG. 2 is a schematic diagram illustrating node reusing in an MPT state tree, according to the present specification. It is worthwhile to note that, in practice, after a transaction in a latest block generated in a blockchain is executed, account states of only some accounts may change. Therefore, when an MPT state tree is constructed, there is no need to construct a new complete MPT state tree based on current state data of all accounts in the blockchain. Instead, only nodes corresponding to accounts whose account states change need to be updated based on an MPT state tree corresponding to a block preceding the latest block. For nodes corresponding to accounts whose account states do not change in the MPT state tree, because no data update occurs on these nodes, corresponding nodes in the MPT state tree corresponding to the block preceding the latest block can be directly reused.

As shown in FIG. 2, assume that the account state data in Table 1 is the latest account states of all the accounts in the blockchain after a transaction in block N is executed, an MPT state tree organized based on the account state data in Table 1 is still shown in FIG. 1.

Assume that after a transaction in block N+1 is executed, an account state of the account address "a7f9365" in Table 1 is updated from "state3" to "state5". In this case, when the MPT state tree is updated on block N+1, there is no need to construct a new MPT state tree based on current state data of all the accounts in the blockchain after the transaction in block N+1 is executed.

In this case, only value in a leaf node whose "key-end" is "9365" in an MPT state tree (that is, the MPT state tree shown in FIG. 1) corresponding to block N can be updated from "state3" to "state5", and then hash indexes of all nodes on a path from the root node to the leaf node can be updated.

That is, when a leaf node in the MPT state tree is updated, because an overall hash value of the leaf node is updated, hash indexes of all nodes on a path from the root node to the leaf node are also updated accordingly.

For example, still referring to FIG. 2, in addition to updating value in the leaf node whose "key-end" is "9365" in the MPT state tree, a hash index that points to the leaf node and that is padded in an f field of a previous branch node of the leaf node needs to be updated. Further, tracing back to the root node, a hash index that points to the branch node and that is padded in a "next node" field of a previous root node (Root Extension Node) of the branch node continues to be updated.

Except the updated nodes, for all other un-updated nodes, their corresponding nodes in the MPT state tree of block N can be directly reused.

The MPT tree corresponding to block N finally needs to be reserved as historical data. Therefore, when the MPT state tree is updated on block N+1, the updated nodes are not directly modified or updated based on original nodes in the MPT state tree corresponding to block N, but are re-established in the MPT tree corresponding to block N+1. That is, in the MPT state tree corresponding to block N+1, only a few updated nodes actually need to be re-established, and for other un-updated nodes, corresponding nodes in the MPT state tree corresponding to block N can be directly reused.

For example, as shown in FIG. 2, for the MPT state tree corresponding to block N+1, only one extension node used as a root node, one branch node, and one leaf node actually need to be re-established; and for the un-updated nodes, hash indexes pointing to the corresponding nodes in the MPT state tree corresponding to block N can be added to these re-established nodes in the MPT state tree to complete node "reusing". The updated nodes in the MPT state tree corresponding to block N are stored as historical account state data. For example, a leaf node whose "key-end" is "9365" and whose value is "state3" in FIG. 2 is reserved as historical data.

In the previous example, content update occurs on a few nodes in the MPT state tree of block N+1, so that most nodes of the previous block (block N) can be "reused". In practice, a node can be added to the MPT state tree of block N+1 compared with the previous block (block N). In this case, although the added node cannot be directly "reused" from the MPT tree of the previous block (block N), the added node can be "reused" from an MPT state tree of an earlier block.

For example, although the node added to the MPT state tree of block N+1 does not appear in the MPT state tree of block N, the node may appear in an MPT state tree of an earlier block, for example, appear in an MPT state tree of block N−1. Therefore, for the node added to the MPT state tree of block N+1, a corresponding node in the MPT state tree of block N−1 can be directly reused.

In practice, a public chain, a private chain, and a consortium chain all can provide a smart contract function. A smart contract on a blockchain is a contract whose execution can be triggered by a transaction on the blockchain. The smart contract can be defined in a form of code.

For example, for Ethereum, users can be supported in creating and invoking some complex logic in an Ethereum network. Ethereum is a programmable blockchain, the core of Ethereum is an Ethereum virtual machine (EVM), and each Ethereum node can run the EVM. The EVM is a Turing-complete virtual machine, through which various types of complex logic can be implemented. A smart contract published and invoked by a user in Ethereum runs on the EVM. Actually, the EVM directly runs virtual machine code (virtual machine byte code, briefly referred to as "byte code" below), and therefore the smart contract deployed on the blockchain can be byte code.

Figure 3:
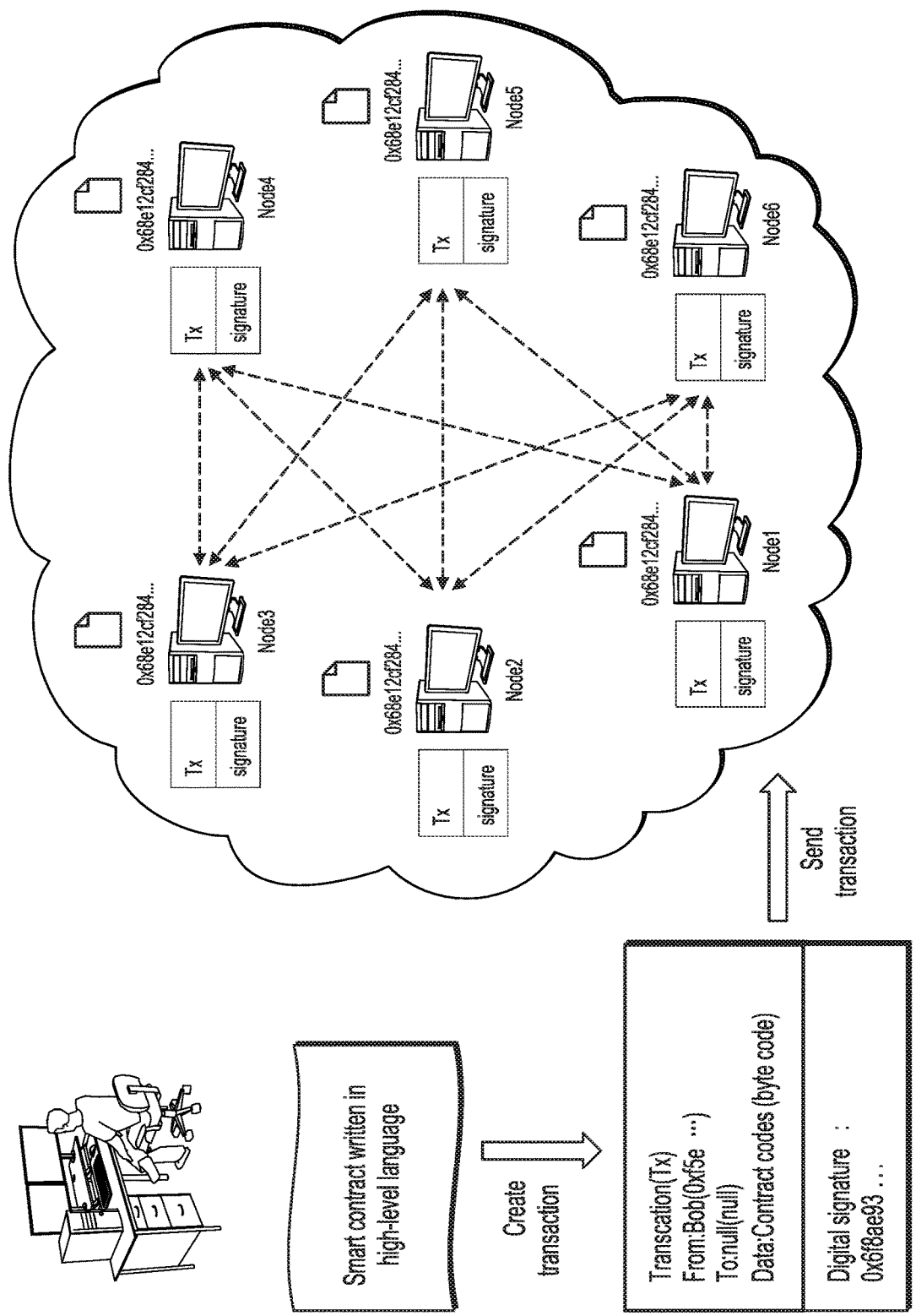
FIG. 3 is a schematic diagram illustrating a smart contract creation process, according to the present specification.

As shown in FIG. 3, after Bob sends a transaction that includes information about creating a smart contract to an Ethereum network, each node can execute the transaction on an EVM. The from field of the transaction in FIG. 3 is used to record an address of an account that initiates to create the smart contract, contract code stored in a field value of the data field of the transaction can be byte code, and a field value of the to field of the transaction is a null account. After an agreement is reached among nodes through a consensus mechanism, the smart contract is successfully created, and subsequently the user can invoke the smart contract.

After the smart contract is created, a contract account corresponding to the smart contract appears on the blockchain and has a specific address. For example, "0x68e12cf284... " in each node in FIG. 3 represents the address of the created contract account. The contract code and account storage will be stored in account storage of the contract account. Behavior of the smart contract is controlled by the contract code, and the account storage of the smart contract stores a state of the contract. In other words, the smart contract enables a virtual account including the contract code and the account storage to be generated on the blockchain.

As mentioned above, the data field of the transaction that includes the information about creating the smart contract can store the byte code of the smart contract. The byte code consists of a series of bytes. Each byte can identify one operation. Considering various aspects such as development efficiency and readability, a developer may not write the byte code directly, but selects an advanced language to write the smart contract code. For example, the advanced language can be Solidity language, Serpent language, or LLL language. The smart contract code written in the advanced language can be compiled by a compiler, to generate byte code that can be deployed on the blockchain.

For example, for the Solidity language, contract code written in the Solidity language is very similar to a class in an object-oriented programming language, and multiple members can be declared in a contract, and includes a state variable, a function, a function modifier, an event, etc. The state variable is a value that is permanently stored in the account storage field of the smart contract and is used to store a state of the contract.

Figure 4:
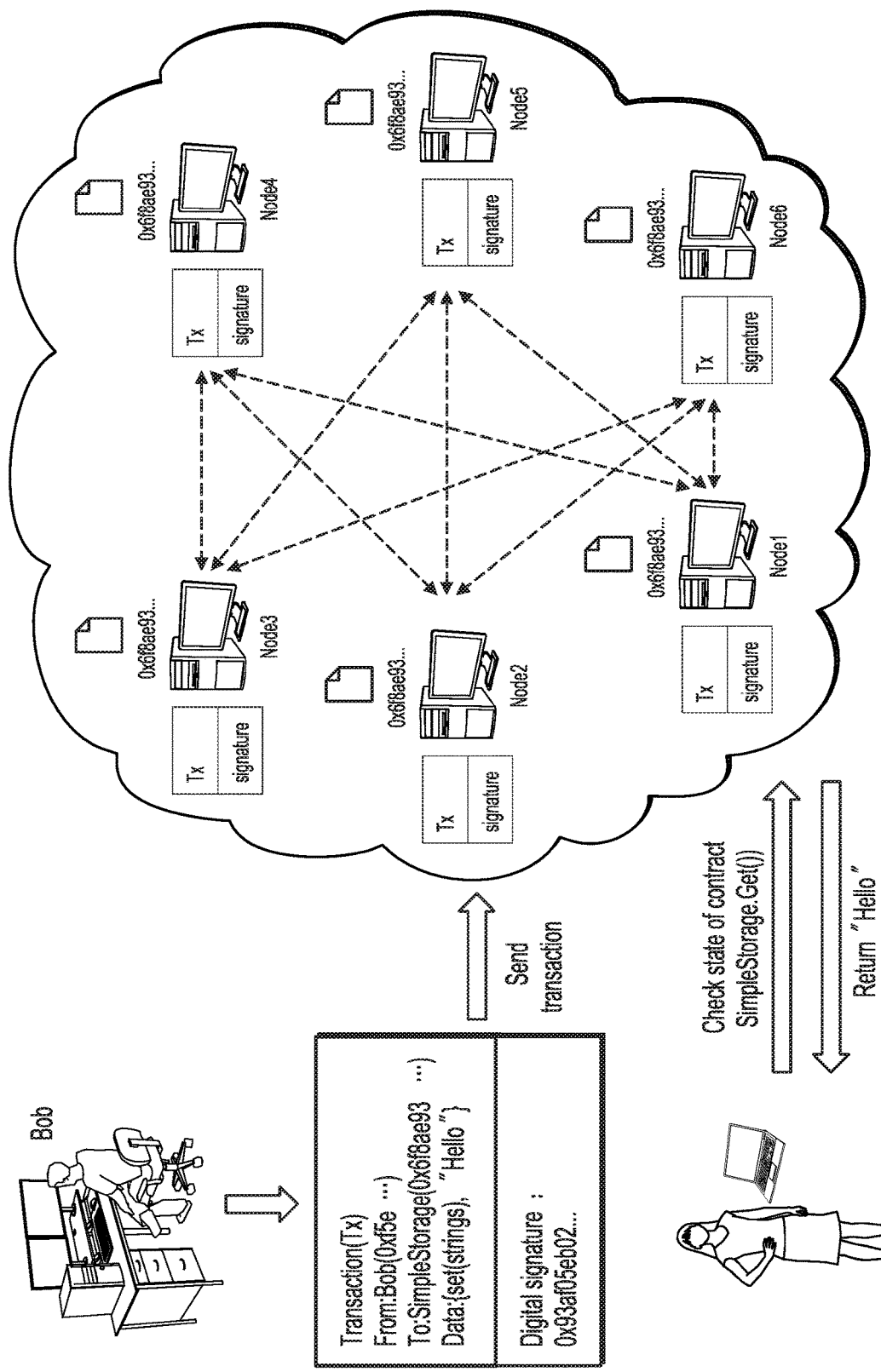
FIG. 4 is a schematic diagram illustrating a smart contract invocation process, according to the present specification.

As shown in FIG. 4, Ethereum is still used as an example. After Bob sends a transaction that includes information about invoking a smart contract to an Ethereum network, each node can execute the transaction on an EVM. The from field of the transaction in FIG. 4 is used to record an address of an account that initiates to invoke the smart contract, the to field is used to record an address of the invoked smart contract, and the data field of the transaction is used to record a method and a parameter used to invoke the smart contract. After the smart contract is invoked, an account state of a contract account may change. Subsequently, a certain client can view the account state of the contract account by using a blockchain node (for example, node 1 in FIG. 4) accessed by the client.

The smart contract can be executed independently on each node in the blockchain network in a specified way, and all execution records and data are stored in the blockchain. Therefore, after such a transaction is executed, a transaction voucher that can be neither tampered with nor lost is stored in the blockchain.

Figure 5:
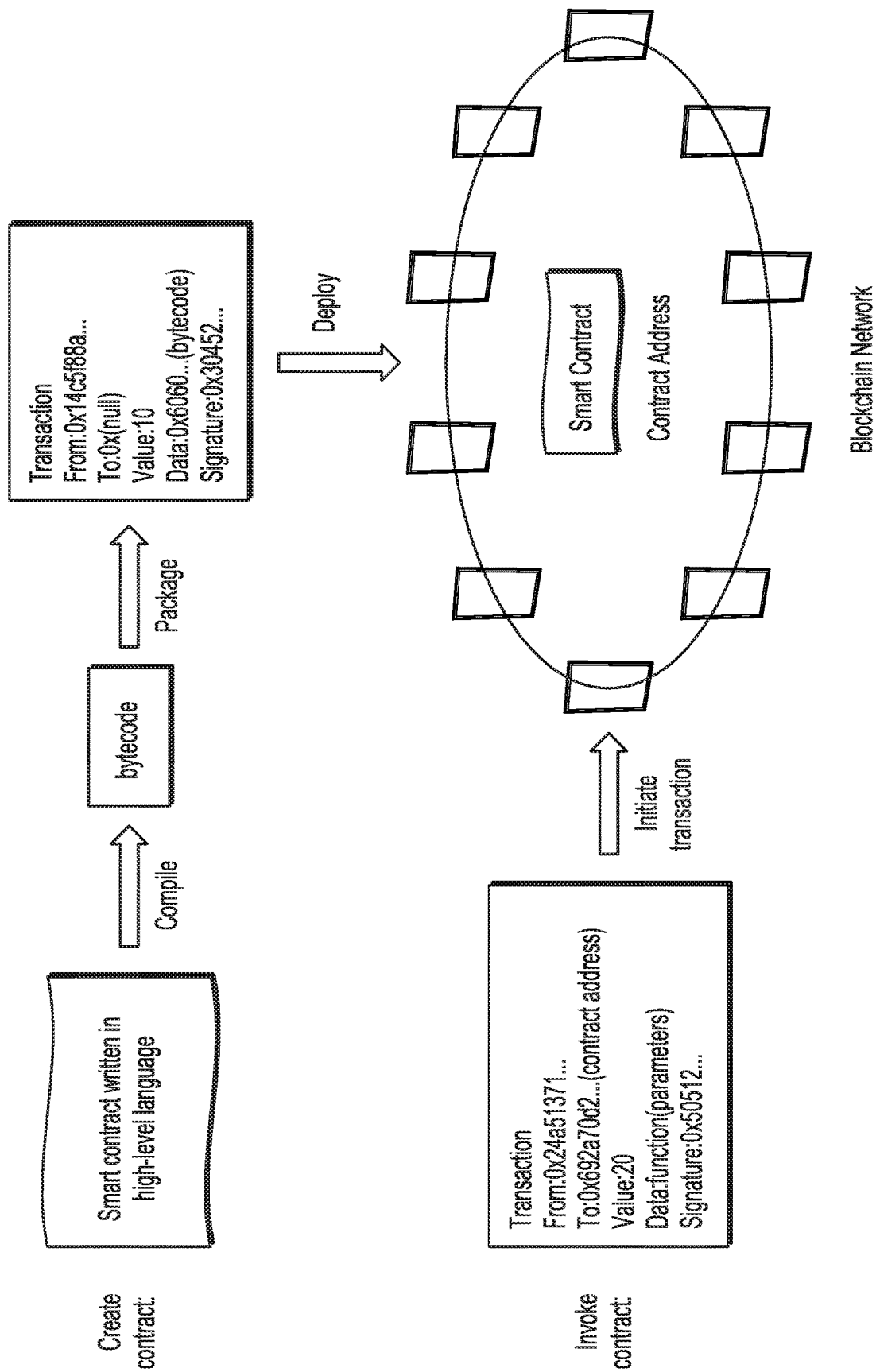
FIG. 5 is a schematic diagram illustrating a smart contract creation and invocation process, according to the present specification.

A schematic diagram illustrating smart contract creation and smart contract invocation is shown in FIG. 5. To create a smart contract in Ethereum, processes such as writing a smart contract, convert smart contract code into byte code, and deploying the byte code on the blockchain are needed. Invoking a smart contract in Ethereum is initiating a transaction pointing to an address of the smart contract. An EVM of each node can separately execute the transaction, so that smart contract code can run on the virtual machine of each node in the Ethereum network in a distributed way.

For a conventional blockchain project represented by Ethereum, to implement "value transfer" on a blockchain, conversion of a currency in the real world into a virtual coin that can be circulated on the chain is usually supported.

In the blockchain field, some blockchain projects (such as an ant blockchain) derived from the Ethereum architecture usually no longer support a function of converting a currency in the real world into a virtual coin that can be circulated on the chain. Instead, in these blockchain projects, some physical assets without a currency attribute in the real world can be converted into virtual assets that can be circulated on the blockchain.

It is worthwhile to note that conversion of physical assets without a currency attribute in the real world into virtual assets on the blockchain is usually a process of "anchoring" the physical assets with virtual assets on the blockchain as a value support of the virtual assets, and then generating, on the blockchain, virtual assets that match the value of the physical assets and that can be circulated between blockchain accounts on the blockchain.

During implementation, an account type supported by the blockchain can be extended, and an asset account (also referred to as an asset object) can be further obtained by extending the account type supported by the blockchain. For example, an asset account can be obtained by extending an external account and a contract account supported by Ethereum. The asset account obtained through extension corresponds to a virtual asset that can use a physical asset without a currency attribute in the real world as a value support and that can be circulated between blockchain accounts.

For a user accessing such a blockchain, in addition to creating a user account and a smart contract on the blockchain, the user can create a virtual asset that matches the value of a physical asset without a currency attribute in the real world on the blockchain, to be circulated on the blockchain.

For example, the user can convert held physical assets without a currency attribute, such as real estate, stock, loan contract, bill, and accounts receivable, into value-matched virtual assets to be circulated on the blockchain.

For the asset account, an account state of the account can also be specifically maintained by using a structure. Content included in the structure of the asset account can be the same as the content included in the structure of the account in Ethereum, or certainly can be designed based on an actual demand.

In an implementation, for example, the content included in the structure of the asset account is the same as the content included in the structure of the account in Ethereum. In this case, the structure of the asset account can also include the previously described balance field, nonce field, code field, storage field, etc.

It is worthwhile to note that, in Ethereum, the balance field is usually used to maintain a current account balance of an account. However, for a blockchain project derived from the Ethereum architecture, because the blockchain project may not support conversion of a currency in the real world into a virtual coin that can be circulated on the chain, in such a blockchain, the meaning of the balance field can be extended, so that the balance field no longer represents the "balance" of the account, but is used to maintain address information of an asset account corresponding to a "virtual asset" held by the account. In practice, the balance field can maintain address information of asset accounts corresponding to multiple "virtual assets".

In this case, the external account, the contract account, and the asset account shown above all can hold a virtual asset by adding address information of an asset account corresponding to the "virtual asset" that needs to be held to the balance field. That is, in addition to the external account and the contract account, the asset account itself can also hold a virtual asset.

For the asset account, field values of the nonce field and the code field may be null (or may not be null), a field value of the storage field may not be null anymore, and the storage field can be used to maintain an asset state of a "virtual asset" corresponding to the asset account. A specific method for maintaining the asset state of the "virtual asset" corresponding to the asset account in the storage field can be flexibly designed based on a demand, and details are omitted here for simplicity.

In a blockchain project derived from the Ethereum architecture, a user can use the following implementations to create a virtual asset that matches the value of a physical asset without a currency attribute in the real world value on the blockchain.

In an implementation, a transaction type supported by the blockchain can be extended to obtain a transaction for creating a virtual asset. For example, transaction types supported by Ethereum usually include a common transfer transaction, a transaction for creating a smart contract, and a transaction for invoking a smart contract. In this case, the three types of transactions can be extended to obtain a transaction for creating a virtual asset.

In this case, the user can publish a transaction for creating a virtual asset to the blockchain network by using a client, and a node device in the blockchain executes the transaction on a local EVM to create a virtual asset for the user. After an agreement is reached among node devices through a consensus mechanism, the virtual asset is successfully created, and an asset account corresponding to the virtual asset appears on the blockchain and has a specific address.

In another implementation, a smart contract for creating a virtual asset can be deployed on the blockchain, and details of a process of deploying the smart contract for creating a virtual asset are omitted here for simplicity.

In this case, the user can publish a transaction for invoking the smart contract to the blockchain network by using a client, and a node device in the blockchain executes the transaction on a local EVM, and runs contract code related to the smart contract on the EVM, to create a virtual asset for the user. After an agreement is reached among node devices through a consensus mechanism, the virtual asset is successfully created, and an asset account corresponding to the virtual asset appears on the blockchain and has a specific address.

Certainly, for some blockchain projects derived from the Ethereum architecture, if the blockchain projects also support the function of converting a currency in the real world into a virtual coin that can be circulated on the chain, some physical assets without a currency attribute in the real world can still be converted into a form of virtual coins that can be circulated on the blockchain, to be circulated on the blockchain. Details are omitted here for simplicity in the present specification.

In a cross-chain scenario, multiple blockchains can implement cross-chain connection through cross-chain relays.

The cross-chain relays can be separately connected to the multiple blockchains by using bridge interfaces, and complete cross-chain data synchronization among the multiple blockchains based on implemented data transport logic.

A cross-chain technology used to implement the cross-chain relays is not specially limited in the present specification. For example, in practice, multiple blockchains can be connected by using a cross-chain mechanism such as a side chain technology or a notary technology.

After the multiple blockchains are connected by using the cross-chain relays, data on other blockchains can be read and authenticated among the blockchains, and smart contracts deployed on other blockchains can be invoked among the blockchains by using the cross-chain relays.

In addition to using data stored in a blockchain, a smart contract deployed on the blockchain can reference data on a data entity off the chain by using an oracle machine, to implement data exchange between the smart contract and the data entity in the real world. The data entity off the chain can include a centralized server, data center, etc. deployed off the chain.

Different from the cross-chain relay, the oracle machine is not used to synchronize data on a blockchain to another blockchain, but is used to synchronize data on a data entity off a chain to the blockchain.

That is, the cross-chain relay is used to connect two blockchains, and the oracle machine is used to connect a blockchain and a data entity off the chain to implement data exchange between the blockchain and the real world.

The present specification aims to provide the following technical solution: Multiple levels of accounts used to maintain e-bill number segments are established in a blockchain, to allocate e-bill numbers to any account from an e-bill number segment maintained in an upper-level account corresponding to the account, thereby preventing a quantity corresponding to an e-bill number segment maintained in each level of account from being insufficient.

In practice, an account manager of any level of account in the blockchain can be used as a number applicant to actively apply for e-bill numbers from an e-bill number segment maintained in an upper-level account corresponding to the account of the number applicant.

Specifically, the number applicant can construct a number application transaction that includes an account identifier of the account of the number applicant, and publish the constructed number application transaction to the blockchain for storage. That is, node devices in the blockchain can perform consensus processing on the received number application transaction, and after reaching a consensus, the node devices pack the number application transaction into a block for persistence storage in the blockchain.

For the number application transaction packed into the block, the node device in the blockchain can execute the number application transaction, that is, in response to the number application transaction, allocate e-bill numbers to the number applicant from the e-bill number segment maintained in the upper-level account corresponding to the account of the number applicant, and add the e-bill numbers allocated to the number applicant to the account of the number applicant for maintenance.

In addition, when it is determined that a quantity corresponding to an e-bill number segment maintained in an account of a biller that performs billing processing based on the blockchain is insufficient, e-bill numbers can be applied for from an e-bill number segment maintained in an upper-level account corresponding to the account of the biller, to complete the billing processing.

Specifically, the biller can construct a billing transaction that includes billing information and an account identifier of the account of the biller, and publish the constructed billing transaction to the blockchain for storage. That is, the node devices in the blockchain can perform consensus processing on the received billing transaction, and after reaching a consensus, the node devices pack the billing transaction into a block for persistence storage in the blockchain.

For the billing transaction packed into the block, the node device in the blockchain can execute the billing transaction, that is, in response to the billing transaction, first determine whether the quantity corresponding to the e-bill number segment maintained in the account of the biller is sufficient.

If the quantity corresponding to the e-bill number segment maintained in the account of the biller is insufficient, it can be considered that the biller currently does not have enough remaining bills for the billing processing. Therefore, e-bill numbers can be further allocated to the biller from the e-bill number segment maintained in the upper-level account corresponding to the billing account, and the e-bill numbers allocated to the biller can be added to the account of the biller for maintenance. Subsequently, a target e-bill number used for the current billing processing can be allocated to the biller from the e-bill numbers allocated to the account of the biller, so that a corresponding e-bill can be created based on the target e-bill number and the previously described billing information in the billing transaction.

Correspondingly, if the quantity corresponding to the e-bill number segment maintained in the account of the biller is sufficient, a target e-bill number used for the current billing processing can be directly allocated to the biller from the e-bill number segment maintained in the account of the biller, so that a corresponding e-bill can be created based on the target e-bill number and the billing information in the billing transaction.

In the previous technical solutions, an account manager of any level of account in the blockchain can be used as a number applicant to actively apply for e-bill numbers from an e-bill number segment maintained in an upper-level account corresponding to the account of the number applicant. Alternatively, when it is determined that a quantity corresponding to an e-bill number segment maintained in an account of a biller that performs billing processing based on the blockchain is insufficient, e-bill numbers are applied for from an e-bill number segment maintained in an upper-level account corresponding to the account of the biller. As such, automatic application can be implemented for an e-bill number segment maintained in each level of account, to alleviate the problem that a quantity corresponding to the e-bill number segment maintained in each level of account in the blockchain is insufficient.

Figure 6:
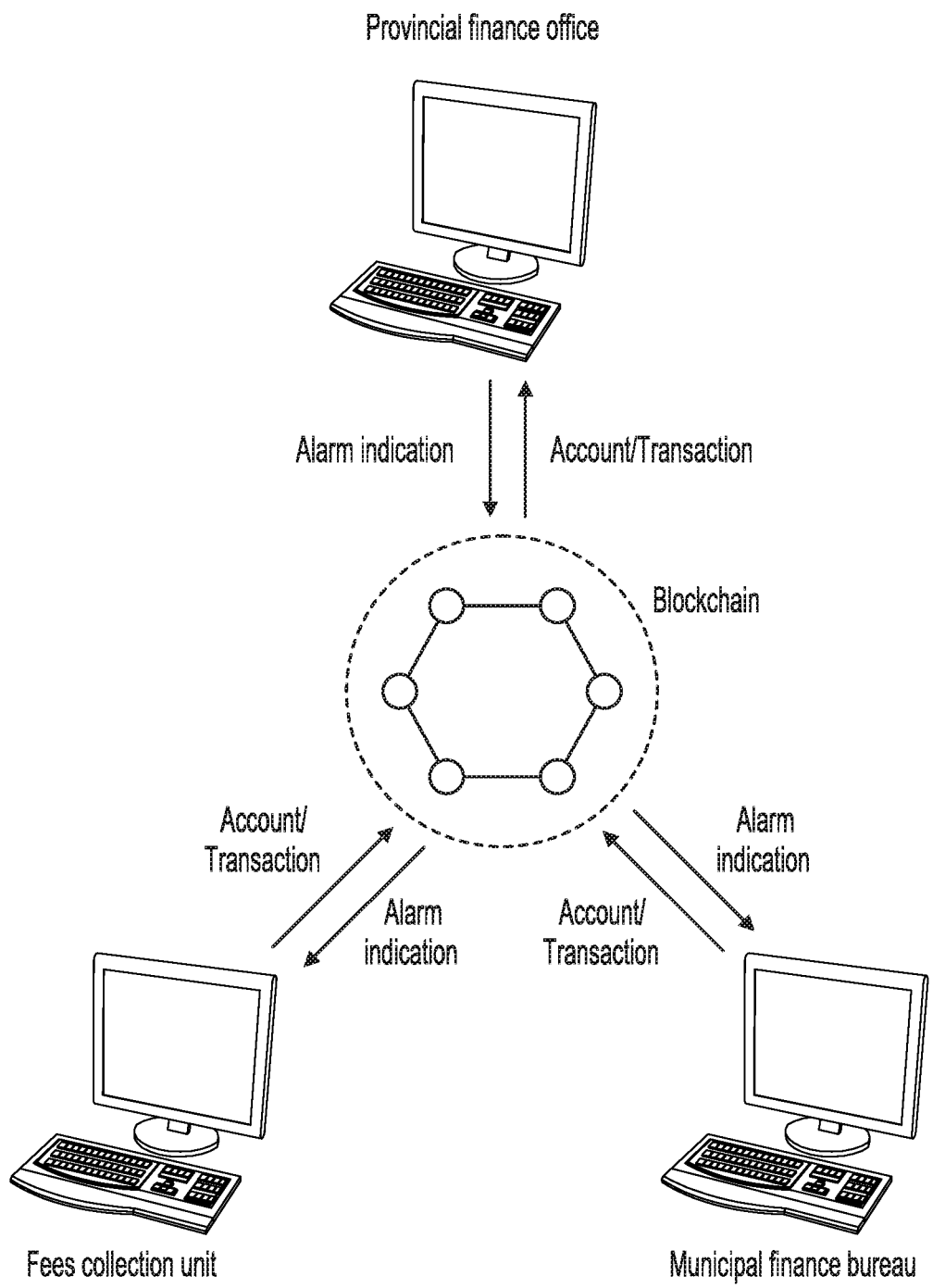
FIG. 6 is a schematic diagram illustrating a blockchain-based e-bill management system, according to an example implementation of the present specification.

FIG. 6 is a schematic diagram illustrating a blockchain-based e-bill management system, according to an example implementation of the present specification.

In the blockchain-based e-bill management system shown in FIG. 6, the blockchain can include multiple levels of accounts used to maintain e-bill number segments, for example, an account of a fees collection unit, an account of a municipal finance bureau (that is, an upper-level account corresponding to the account of the fees collection unit), and an account of a provincial finance office (that is, an upper-level account corresponding to the account of the municipal finance bureau).

In practice, an account manager of each level of account can establish the account in the blockchain (for example, an account manager of the account of the fees collection unit is the fees collection unit, an account manager of the account of the municipal finance bureau is the municipal finance bureau, and an account manager of the account of the provincial finance office is the provincial finance office). Specifically, the account manager can establish the account by registering the account in the blockchain by using a client used by the account manager.

Referring to the previous descriptions of the account in the blockchain, the account can be an external account in the blockchain or can be a contract account in the blockchain, which is not limited in the present specification; and an e-bill number segment maintained in the account can be stored in a storage field of the account, or can be stored in a balance field of the account, which is not limited in the present specification.

For each level of account, referring to the previous descriptions of the account in the blockchain, an account identifier of an upper-level account corresponding to the account can be stored in a storage field of the account, that is, subsequently, the upper-level account corresponding to the account can be directly determined based on the storage field of the account.

The account identifier can be an account address, that is, an account address of the upper-level account corresponding to the account can be stored in the storage field of the account. Alternatively, the account identifier can be identification information such as a name or a number specified for the account. In this case, both identification information of the account and identification information of the upper-level account corresponding to the account can be stored in the storage field of the account.

Figure 7:
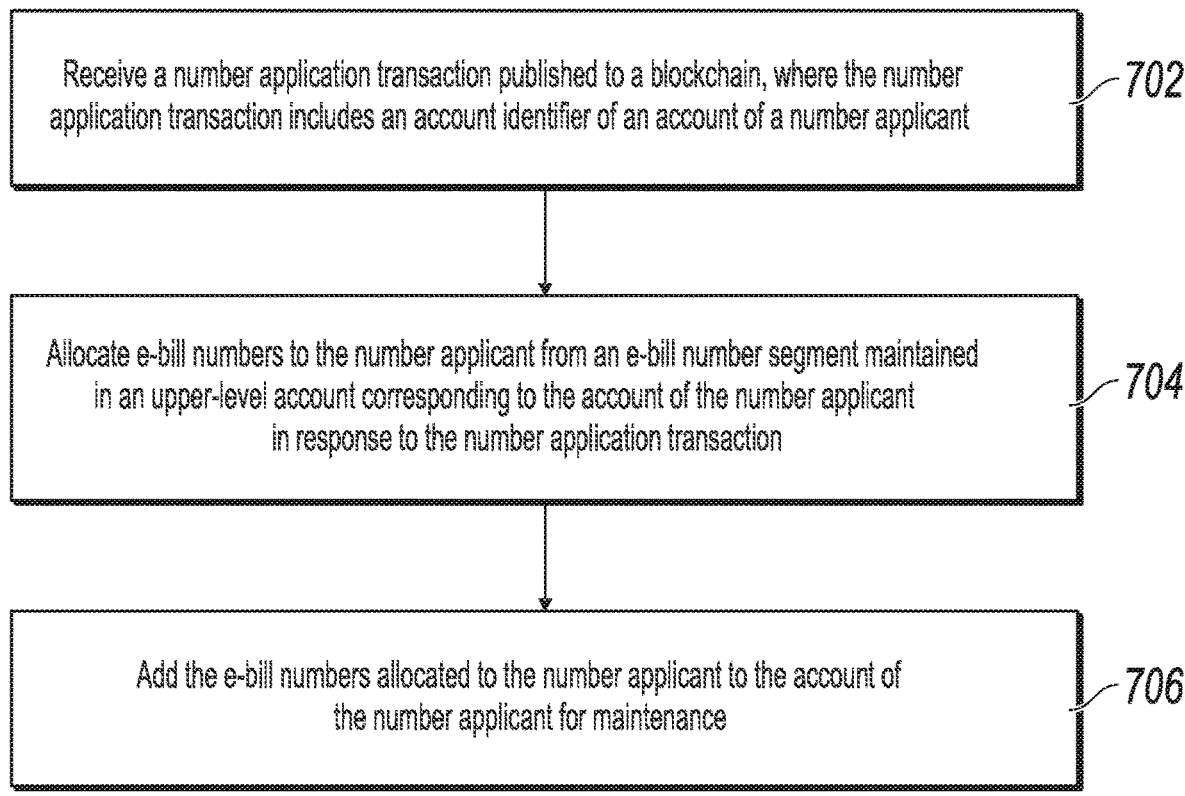
FIG. 7 is a flowchart illustrating a blockchain-based e-bill number application method, according to an example implementation of the present specification.

FIG. 7 is a flowchart illustrating a blockchain-based e-bill number application method, according to an example implementation of the present specification. The method is applicable to an electronic device that joins the blockchain as a node device in the blockchain-based e-bill management system shown in FIG. 6. The electronic device can be a server, a computer, a mobile phone, a tablet device, a notebook computer, a personal digital assistant (PDA), etc., and is not limited in the present specification. The method can include the following steps:

Step 702: Receive a number application transaction published to the blockchain, where the number application transaction includes an account identifier of an account of a number applicant.

Step 704: Allocate e-bill numbers to the number applicant from an e-bill number segment maintained in an upper-level account corresponding to the account of the number applicant in response to the number application transaction.

Step 706: Add the e-bill numbers allocated to the number applicant to the account of the number applicant for maintenance.

The following describes the technical solutions in the present specification in detail by using an example in which a data structure of an MPT tree is used to organize account state data in a blockchain into an MPT state tree.

It is worthwhile to note that using the data structure of the MPT tree to organize the account state data in the blockchain is only an example.

In practice, for a blockchain project derived from the Ethernet architecture, in addition to an improved Merkle tree such as the MPT tree, a Merkle tree variant that is similar to the MPT tree and that incorporates the Trie dictionary tree can be used. Examples are not listed one by one in the present specification.

For any level of account in the blockchain, an account manager of the account can be used as a number applicant to actively apply for e-bill numbers from an e-bill number segment maintained in an upper-level account corresponding to the account of the number applicant.

Specifically, the account manager of the account can be used as a number applicant to actively construct a number application transaction, and publish the constructed number application transaction to the blockchain for storage. The number application transaction can include an account identifier of an account of the number applicant (that is, the account).

In a shown implementation, a node device in the blockchain can periodically determine whether a quantity corresponding to an e-bill number segment maintained in each level of account in the blockchain is sufficient.

Specifically, for each level of account, a threshold used to indicate whether a quantity corresponding to an e-bill number segment maintained in the account is sufficient can be specified. If a quantity corresponding to an e-bill number segment maintained in a certain level of account is less than a threshold specified for the account, it can be considered that the quantity corresponding to the e-bill number segment maintained in the account is insufficient. If the quantity corresponding to the e-bill number segment maintained in the account is greater than or equal to the threshold, it can be considered that the quantity corresponding to the e-bill number segment maintained in the account is sufficient.

For example, assume that a threshold specified for a certain level of account is 1000, and further assume that an e-bill number segment maintained in the account is 80001 to 80900, because the quantity corresponding to the e-bill number segment maintained in the account is 899 and is less than 1000 used as the threshold, it can be considered that the quantity corresponding to the e-bill number segment maintained in the account is insufficient.

In practice, different thresholds can be specified for different accounts, or the same threshold can be specified for different accounts, or the same threshold can be specified for all accounts. Implementations are not limited in the present specification.

If it is determined that a quantity corresponding to an e-bill number segment maintained in any level of account (referred to as a target account) is insufficient, the node device in the blockchain can send an alarm indication to a client corresponding to the target account (that is, a client used by an account manager of the target account). When receiving the alarm indication, the client can construct a number application transaction, and publish the constructed number application transaction to the blockchain. In addition, the client can also give, to the account manager of the target account by using a method such as an audiovisual alarm or text output, a prompt that the quantity corresponding to the e-bill number segment currently maintained in the target account is insufficient.

That is, in this case, the account manager of the target account can be used as a number applicant to actively construct the number application transaction, and publish the constructed number application transaction to the blockchain for storage, to trigger a subsequent process of allocating e-bill numbers to the target account from an e-bill number segment maintained in an upper-level account corresponding to the target account.

Referring to the previous process of persistently storing real data generated in the physical world in a blockchain, node devices in the blockchain can receive the number application transaction, and then can perform consensus processing on the received number application transaction; and after reaching a consensus, the node devices pack the number application transaction into a block for persistent storage in the blockchain.

For the number application transaction packed into the block, the node device in the blockchain can execute the number application transaction, that is, in response to the number application transaction, first determine the account of the number applicant based on an account identifier in the number application transaction; and then determine the upper-level account corresponding to the account of the number applicant, and allocate the e-bill numbers to the number applicant from the e-bill number segment maintained in the upper-level account; and finally add the e-bill numbers allocated to the number applicant to the account of the number applicant for maintenance.

In a shown implementation, the number application transaction can include information about invoking a smart contract. The node device in the blockchain can invoke a smart contract deployed on the blockchain in response to the number application transaction, to allocate the e-bill numbers to the number applicant from the e-bill number segment maintained in the upper-level account corresponding to the account of the number applicant.

For a process of creating and invoking the smart contract, references can be made to the previous process of creating and invoking a smart contract. Details are omitted here for simplicity in the present specification.

In another shown implementation, the number application transaction can be defined as a specific transaction type, that is, a transaction of the transaction type can trigger allocation of e-bill numbers to a user account publishing the transaction from an e-bill number segment maintained in an upper-level account corresponding to the user account.

In this case, in response to the number application transaction, the node device in the blockchain can directly perform the subsequent operation of allocating the e-bill numbers to the number applicant from the e-bill number segment maintained in the upper-level account corresponding to the account of the number applicant.

In practice, when allocating the e-bill numbers to the number applicant from the e-bill number segment maintained in the upper-level account corresponding to the account of the number applicant, the node device in the blockchain can first determine whether a quantity corresponding to the e-bill number segment maintained in the upper-level account corresponding to the account of the number applicant is sufficient.

If the quantity corresponding to the e-bill number segment maintained in the upper-level account is sufficient, the node device in the blockchain can directly allocate the e-bill numbers to the number applicant from the e-bill number segment maintained in the upper-level account.

Specifically, a quantity for e-bill number allocation can be specified for each level of account. The node device in the blockchain can allocate e-bill numbers whose quantity is equal to a quantity specified for the upper-level account in the e-bill number segment maintained in the upper-level account to the number applicant based on a specific e-bill number allocation rule, for example, allocate e-bill numbers that are arranged in the front of the e-bill number segment maintained in the upper-level account and whose quantity is equal to the quantity specified for the upper-level account to the number applicant.

If the quantity corresponding to the e-bill number segment maintained in the upper-level account is insufficient, the node device in the blockchain can further allocate e-bill numbers to the upper-level account from an e-bill number segment maintained in an upper-level account corresponding to the upper-level account, and then allocate e-bill numbers to the number applicant from an e-bill number segment maintained in the upper-level account corresponding to the account of the number applicant.

To simplify e-bill number application logic, in a shown implementation, if the quantity corresponding to the e-bill number segment maintained in the upper-level account is insufficient, the node device in the blockchain can send an alarm indication to a client corresponding to the upper-level account (that is, a client used by an account manager of the upper-level account). When receiving the alarm indication, the client can construct a number application transaction, and publish the constructed number application transaction to the blockchain. In addition, the client can also give, to the account manager of the upper-level account by using a method such as an audiovisual alarm or text output, a prompt that the quantity corresponding to the e-bill number segment currently maintained in the upper-level account is insufficient.

That is, in this case, the account manager of the upper-level account can be used as a number applicant to actively construct the number application transaction, and publish the constructed number application transaction to the blockchain for storage, to trigger the subsequent process of allocating the e-bill numbers to the upper-level account from the e-bill number segment maintained in the upper-level account corresponding to the upper-level account.

Alternatively, event information that the e-bill number segment maintained in the upper-level account is insufficient can be generated by using the smart contract, and the event information can be published to the blockchain for storage. The client corresponding to the upper-level account can listen for data stored in the blockchain, so that the client corresponding to the upper-level account can detect the event information through listening. When detecting the event information through listening, the client can construct the number application transaction, and publish the constructed number application transaction to the blockchain, to trigger the subsequent process of allocating the e-bill numbers to the upper-level account from the e-bill number segment maintained in the upper-level account corresponding to the upper-level account.

After the e-bill numbers are allocated to the number applicant, the e-bill numbers allocated to the number applicant can be added to the account of the number applicant for maintenance.

The following describes the implementation shown in FIG. 7 by using examples.

Assume that the blockchain includes an account of fees collection unit A, an account of municipal finance bureau A (that is, an upper-level account corresponding to the account of fees collection unit A), and an account of a provincial finance office A (that is, an upper-level account corresponding to the account of municipal finance bureau A).

For example, assume that a threshold that is specified for the account of fees collection unit A to indicate whether a quantity corresponding to an e-bill number segment maintained in the account is sufficient is 1000, the node device in the blockchain can determine that the e-bill number segment currently maintained in the account of fees collection unit A is 70101 to 70900, so that the quantity is 799 and is less than 1000 used as the threshold. Therefore, the node device in the blockchain can send an alarm indication to a client corresponding to the account of fees collection unit A, to instruct the client to construct a number application transaction, and publish the number application transaction to the blockchain for storage.

For the number application transaction packed into a block, in response to the number application transaction, the node device in the blockchain can invoke number application logic declared in a smart contract deployed on the blockchain, to determine whether a quantity corresponding to an e-bill number segment maintained in the account of municipal finance bureau A is sufficient.

The number application logic can be program code (for example, some program methods or functions that can be invoked) that is declared in the smart contract and that is related to execution logic of e-bill number application.

Assume that a threshold that is specified for the account of municipal finance bureau A to indicate whether the quantity corresponding to the e-bill number segment maintained in the account is sufficient is 2000, the node device in the blockchain can determine that the e-bill number segment currently maintained in the account of municipal finance bureau A is 71001 to 79999, so that the quantity is 8999 and is greater than 2000 used as the threshold. Therefore, the node device in the blockchain can further invoke number allocation logic declared in a smart contract deployed on the blockchain, to allocate e-bill numbers to fees collection unit A from the e-bill number segment maintained in the account of municipal finance bureau A.

The number allocation logic can be program code (for example, some program methods or functions that can be invoked) that is declared in the smart contract and that is related to execution logic of e-bill number allocation.

It is worthwhile to note that the previously described smart contract used for e-bill number application and the previously described smart contract used for e-bill number allocation can be combined into one smart contract to be deployed on the blockchain, or can be deployed on the blockchain as two different smart contracts. Implementations are not limited in the present specification.

Assume that a quantity that is specified for the account of municipal finance bureau A for e-bill number allocation is 2000 and the number allocation logic is allocating e-bill numbers that are arranged in the front of the e-bill number segment maintained in the account and whose quantity is equal to the quantity specified for the account to the number applicant, the node device in the blockchain can allocate 71001 to 73000 to fees collection unit A, and add the e-bill numbers allocated to fees collection unit A to the account of fees collection unit A for maintenance, that is, e-bill number segments subsequently maintained in the account of fees collection unit A are 70101 to 70900 and 71001 to 73000.

For another example, assume that a threshold that is specified for an account of fees collection unit B to indicate whether a quantity corresponding to an e-bill number segment maintained in the account is sufficient is 1000, the node device in the blockchain can determine that the e-bill number segment currently maintained in the account of fees collection unit B is 80101 to 80900, so that the quantity is 799 and is less than 1000 used as the threshold. Therefore, the node device in the blockchain can send an alarm indication to a client corresponding to the account of fees collection unit B, to instruct the client to construct a number application transaction, and publish the number application transaction to the blockchain for storage.

For the number application transaction packed into a block, in response to the number application transaction, the node device in the blockchain can invoke the number application logic, to determine whether a quantity corresponding to an e-bill number segment maintained in an account of municipal finance bureau B is sufficient.

Assume that a threshold that is specified for the account of municipal finance bureau B to indicate whether the quantity corresponding to the e-bill number segment maintained in the account is sufficient is 2000, the node device in the blockchain can determine that the e-bill number segment currently maintained in the account of municipal finance bureau B is 88001 to 89999, so that the quantity is 1999 and is less than 2000 used as the threshold. Therefore, the node device in the blockchain can send an alarm indication to a client corresponding to the account of municipal finance bureau B, to instruct the client to construct a number application transaction, and publish the number application transaction to the blockchain for storage.

For the number application transaction packed into a block, in response to the number application transaction, the node device in the blockchain can invoke the number application logic, to determine whether a quantity corresponding to an e-bill number segment maintained in the account of provincial finance office A is sufficient.

Assume that a threshold that is specified for the account of provincial finance office A to indicate whether the quantity corresponding to the e-bill number segment maintained in the account is sufficient is 5000, the node device in the blockchain can determine that the e-bill number segment currently maintained in the account of provincial finance office A is 60001 to 69999, so that the quantity is 9999 and is greater than 5000 used as the threshold. Therefore, the node device in the blockchain can further invoke the number allocation logic, to allocate e-bill numbers to municipal finance bureau B from the e-bill number segment currently maintained in the account of provincial finance office A.

Assume that a quantity that is specified for the account of provincial finance office A for e-bill number allocation is 2000, the node device in blockchain can allocate 60001 to 62000 to municipal finance bureau B, and add the e-bill numbers allocated to the municipal finance bureau B to the account of municipal finance bureau B for maintenance, that is, e-bill number segments subsequently maintained in the account of municipal finance bureau B are 88001 to 89999 and 60001 to 62000.

The node device in the blockchain can further invoke the number allocation logic to allocate e-bill numbers to fees collection unit B from the e-bill number segments currently maintained in the account of municipal finance bureau B.

Assume that a quantity that is specified for the account of municipal finance bureau B for e-bill number allocation is 2000, the node device in blockchain can allocate 60001 to 62000 to fees collection unit B, and add the e-bill numbers allocated to fees collection unit B to the account of fees collection unit B for maintenance, that is, e-bill number segments subsequently maintained in the account of fees collection unit B are 80101 to 80900 and 60001 to 62000.

In the previous technical solutions, an account manager of any level of account in the blockchain can be used as a number applicant to actively apply for e-bill numbers from an e-bill number segment maintained in an upper-level account corresponding to the account of the number applicant. As such, automatic application can be implemented for an e-bill number segment maintained in each level of account, to alleviate the problem that a quantity corresponding to the e-bill number segment maintained in each level of account in the blockchain is insufficient.

Figure 8:
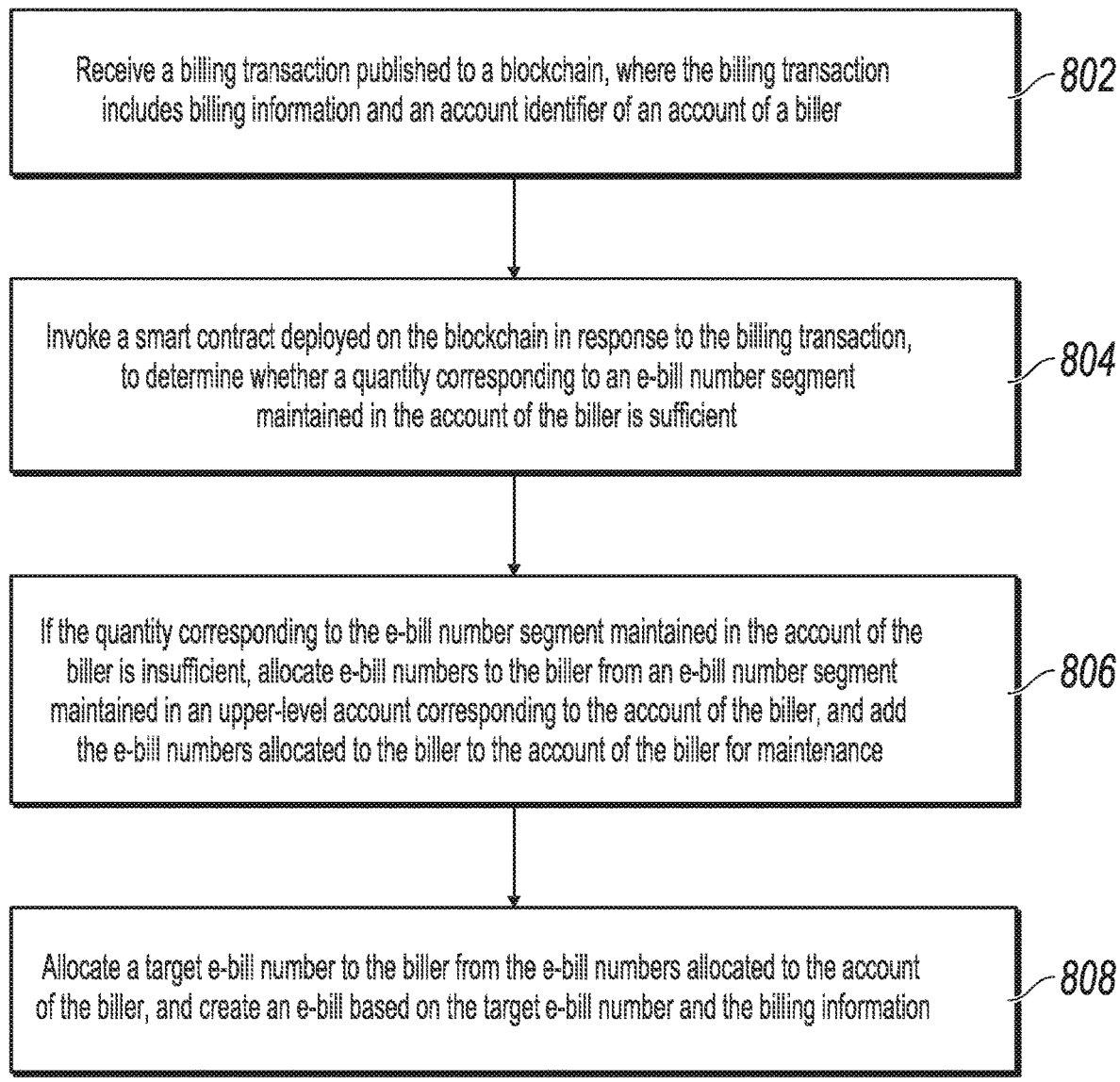
FIG. 8 is a flowchart illustrating a blockchain-based billing method, according to an example implementation of the present specification.

FIG. 8 is a flowchart illustrating a blockchain-based billing method, according to an example implementation of the present specification. The method is applicable to an electronic device that joins the blockchain as a node device in the blockchain-based e-bill management system shown in FIG. 6. The electronic device can be a server, a computer, a mobile phone, a tablet device, a notebook computer, a personal digital assistant (PDA), etc., and is not limited in the present specification. The method can include the following steps:

Step 802: Receive a billing transaction published to the blockchain, where the billing transaction includes billing information and an account identifier of an account of a biller.

Step 804: Invoke a smart contract deployed on the blockchain in response to the billing transaction, to determine whether a quantity corresponding to an e-bill number segment maintained in the account of the biller is sufficient.

Step 806: If the quantity corresponding to the e-bill number segment maintained in the account of the biller is insufficient, allocate e-bill numbers to the biller from an e-bill number segment maintained in an upper-level account corresponding to the account of the biller, and add the e-bill numbers allocated to the biller to the account of the biller for maintenance.

Step 808: Allocate a target e-bill number to the biller from the e-bill numbers allocated to the account of the biller, and create an e-bill based on the target e-bill number and the billing information.

The following describes the technical solutions in the present specification in detail by using an example in which a data structure of an MPT tree is used to organize account state data in a blockchain into an MPT state tree.

It is worthwhile to note that using the data structure of the MPT tree to organize the account state data in the blockchain is only an example.

In practice, for a blockchain project derived from the Ethernet architecture, in addition to an improved Merkle tree such as the MPT tree, a Merkle tree variant that is similar to the MPT tree and that incorporates the Trie dictionary tree can be used. Examples are not listed one by one in the present specification.

For any level of account in the blockchain, if an account manager of the account initiates billing processing as a biller, when determining that a quantity corresponding to an e-bill number segment maintained in the account is insufficient, the node device in the blockchain can apply for e-bill numbers from an e-bill number segment maintained in an upper-level account corresponding to the account, to complete the billing processing.

Specifically, the biller can construct a billing transaction, and publish the constructed billing transaction to the blockchain for storage. The billing transaction can include billing information and an account identifier of the account of the biller.

Referring to the previous process of persistently storing real data generated in the physical world in a blockchain, node devices in the blockchain can receive the billing transaction, and then can perform consensus processing on the received billing transaction; and after reaching a consensus, the node devices pack the billing transaction into a block for persistent storage in the blockchain.

For the billing transaction packed into the block, the node devices in the blockchain can execute the billing transaction, that is, invoke a smart contract deployed on the blockchain in response to the billing transaction, to first determine whether the quantity corresponding to the e-bill number segment maintained in the account of the biller is sufficient.

If the quantity corresponding to the e-bill number segment maintained in the account of the biller is insufficient (for example, the quantity corresponding to the e-bill number segment maintained in the account of the biller is less than a predetermined threshold or is 0), e-bill numbers can be further allocated to the biller from the e-bill number segment maintained in the upper-level account corresponding to the billing account, and the e-bill numbers allocated to the biller can be added to the account of the biller for maintenance. Subsequently, a target e-bill number used for the current billing processing can be allocated to the biller from the e-bill numbers allocated to the account of the biller, so that a corresponding e-bill can be created based on the target e-bill number and the billing information in the billing transaction.

Correspondingly, if the quantity corresponding to the e-bill number segment maintained in the account of the biller is sufficient, a target e-bill number used for the current billing processing can be directly allocated to the biller from the e-bill number segment maintained in the account of the biller, so that a corresponding e-bill can be created based on the target e-bill number and the billing information in the billing transaction.

Specifically, the node device in the blockchain can invoke number application logic declared in a smart contract deployed on the blockchain, to determine whether the quantity corresponding to the e-bill number segment maintained in the account of the biller is sufficient.

If the quantity corresponding to the e-bill number segment maintained in the account of the biller is insufficient, the node device in the blockchain can further invoke number allocation logic declared in a smart contract deployed on the blockchain, to allocate the e-bill numbers to the biller from the e-bill number segment maintained in the upper-level account corresponding to the billing account, and add the e-bill numbers allocated to the biller to the account of the biller for maintenance. Subsequently, the node device in the blockchain can further invoke billing logic declared in a smart contract deployed on the blockchain, to allocate the target e-bill number used for the current billing processing to the biller from the e-bill numbers allocated to the account of the biller, and create the corresponding e-bill based on the target e-bill number and the billing information.

Correspondingly, if the quantity corresponding to the e-bill number segment maintained in the account of the biller is sufficient, the node device in the blockchain can directly invoke the billing logic declared in the smart contract deployed on the blockchain, to allocate the target e-bill number used for the current billing processing to the biller from the e-bill numbers allocated to the account of the biller, and create the corresponding e-bill based on the target e-bill number and the billing information.

The number application logic can be program code (for example, some program methods or functions that can be invoked) that is declared in the smart contract and that is related to execution logic of e-bill number application. The number allocation logic can be program code that is declared in the smart contract and that is related to execution logic of e-bill number allocation. The billing logic can be program code that is declared in the smart contract and that is related to execution logic of e-bill creation.

It is worthwhile to note that the previously described smart contract used for e-bill number application, the previously described smart contract used for e-bill number allocation, and the previously described smart contract used for e-bill creation can be combined into one smart contract to be deployed on the blockchain, or can be deployed on the blockchain as three different smart contracts. Implementations are not limited in the present specification.

For specific implementations of e-bill number application and allocation in the implementation shown in FIG. 8, references can be further made to the implementation shown in FIG. 7. Details are omitted here for simplicity in the present specification.

In the previous technical solutions, when it is determined that a quantity corresponding to an e-bill number segment maintained in an account of a biller that performs billing processing based on the blockchain is insufficient, e-bill numbers can be applied for from an e-bill number segment maintained in an upper-level account corresponding to the account of the biller. As such, automatic application can be implemented for an e-bill number segment maintained in each level of account, to alleviate the problem that a quantity corresponding to the e-bill number segment maintained in each level of account in the blockchain is insufficient.

Corresponding to the previous implementation of the blockchain-based e-bill number application method, the present specification further provides an implementation of a blockchain-based e-bill number application apparatus.

The implementation of the blockchain-based e-bill number application apparatus in the present specification is applicable to an electronic device. The apparatus implementation can be implemented by software, hardware, or a combination of hardware and software. Software implementation is used as an example. As a logical apparatus, the apparatus is formed by reading a corresponding computer program instruction from a nonvolatile memory to a memory by a processor of an electronic device where the apparatus is located.

Figure 9:
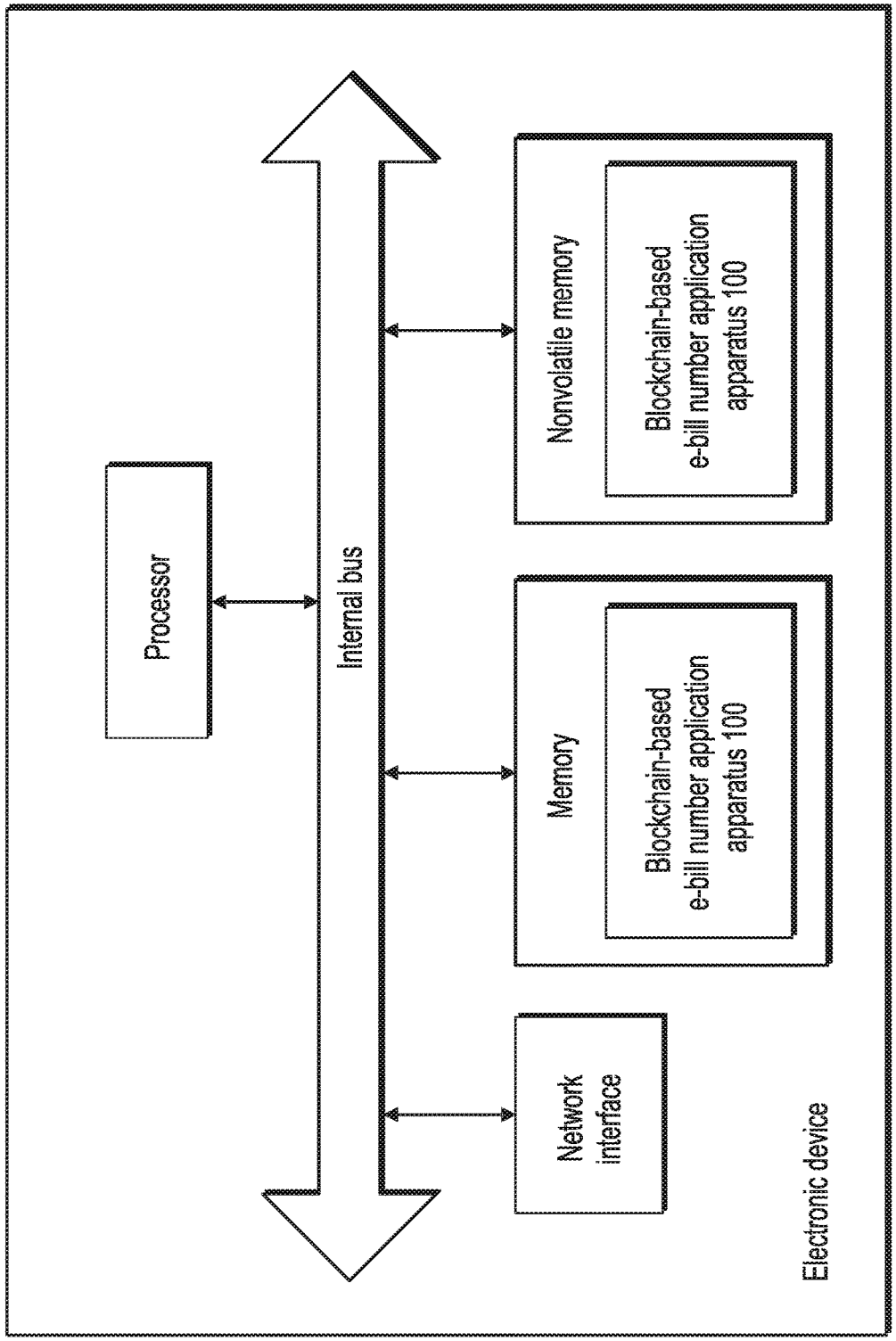
FIG. 9 is a schematic structural diagram illustrating an electronic device, according to an example implementation of the present specification.

In terms of hardware, FIG. 9 is a structural diagram illustrating hardware of an electronic device where the blockchain-based e-bill number application apparatus is located in the present specification. In addition to a processor, a memory, a network interface, and a nonvolatile memory that are shown in FIG. 9, the electronic device where the apparatus is located in the implementation can usually further include other hardware based on actual functions of the blockchain-based e-bill number application apparatus. Details are omitted here for simplicity.

Figure 10:
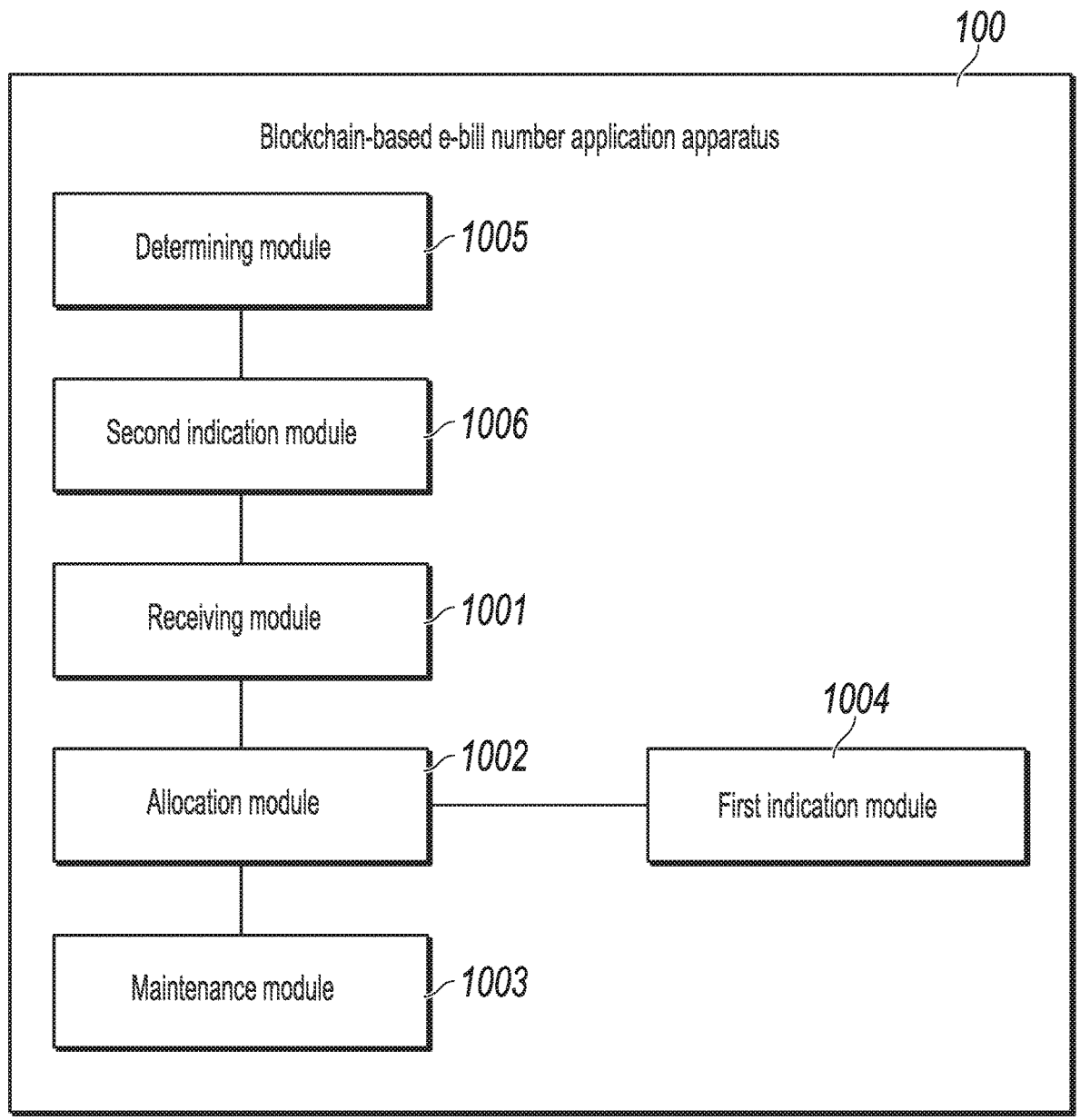
FIG. 10 is a block diagram illustrating a blockchain-based e-bill number application apparatus, according to an example implementation of the present specification.

FIG. 10 is a block diagram illustrating a blockchain-based e-bill number application apparatus, according to an example implementation of the present specification. Apparatus 100 is applicable to the electronic device shown in FIG. 9, and the electronic device can join the blockchain as a node device. The blockchain includes multiple levels of accounts used to maintain e-bill number segments. Apparatus 100 can include: receiving module 1001, configured to receive a number application transaction published to the blockchain, where the number application transaction includes an account identifier of an account of a number applicant; allocation module 1002, configured to allocate e-bill numbers to the number applicant from an e-bill number segment maintained in an upper-level account corresponding to the account of the number applicant in response to the number application transaction; and maintenance module 1003, configured to add the e-bill numbers allocated to the number applicant to the account of the number applicant for maintenance.

In this implementation, allocation module 1002 can be configured to: invoke a smart contract deployed on the blockchain in response to the number application transaction, to allocate the e-bill numbers to the number applicant from the e-bill number segment maintained in the upper-level account corresponding to the account of the number applicant.

In this implementation, allocation module 1002 can be configured to: determine whether a quantity corresponding to the e-bill number segment maintained in the upper-level account corresponding to the account of the number applicant is sufficient; and if the quantity corresponding to the e-bill number segment maintained in the upper-level account is sufficient, allocate the e-bill numbers to the number applicant from the e-bill number segment maintained in the upper-level account.

In this implementation, apparatus 100 can further include: first indication module 1004, configured to: if the quantity corresponding to the e-bill number segment maintained in the upper-level account is insufficient, send an alarm indication to a client corresponding to the upper-level account, to instruct the client to construct a number application transaction and publish the number application transaction to the blockchain; or if the quantity corresponding to the e-bill number segment maintained in the upper-level account is insufficient, generate event information that the quantity corresponding to the e-bill number segment maintained in the upper-level account is insufficient, and publish the event information to the blockchain for storage, so that when detecting the event information through listening, a client corresponding to the upper-level account constructs a number application transaction and publishes the number application transaction to the blockchain.

In this implementation, apparatus 100 can further include: determining module 1005, configured to periodically determine whether a quantity corresponding to an e-bill number segment maintained in each level of account in the multiple levels of accounts is sufficient; and second indication module 1006, configured to: if a quantity corresponding to an e-bill number segment maintained in any level of target account in the multiple levels of accounts is insufficient, send an alarm indication to a client corresponding to the target account, to instruct the client to construct a number application transaction and publish the number application transaction to the blockchain.

Corresponding to the previous implementation of the blockchain-based billing method, the present specification further provides an implementation of a blockchain-based billing apparatus.

The implementation of the blockchain-based billing apparatus in the present specification is applicable to an electronic device. The apparatus implementation can be implemented by software, hardware, or a combination of hardware and software. Software implementation is used as an example. As a logical apparatus, the apparatus is formed by reading a corresponding computer program instruction from a nonvolatile memory to a memory by a processor of an electronic device where the apparatus is located.

Figure 11:
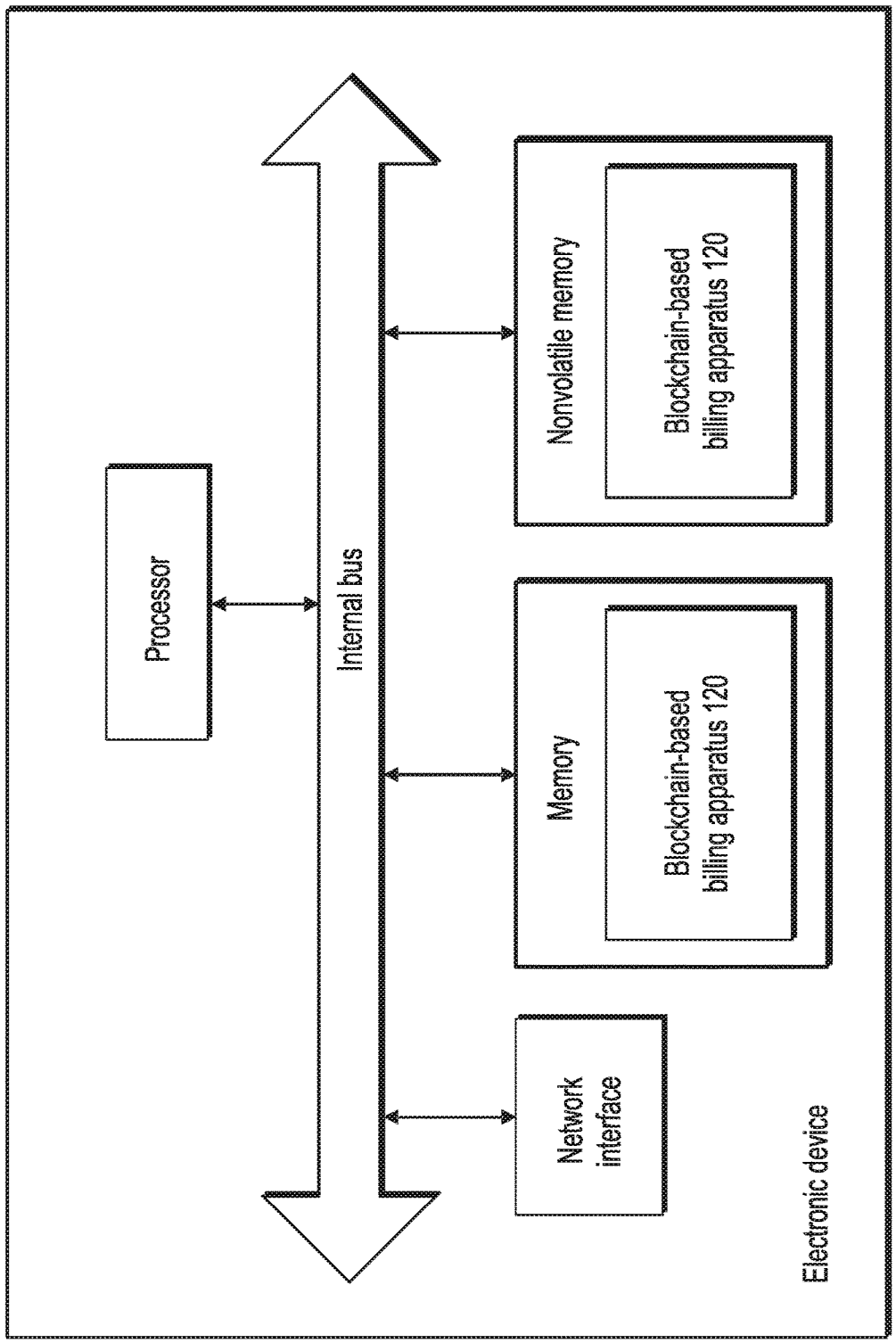
FIG. 11 is a schematic structural diagram illustrating another electronic device, according to an example implementation of the present specification.

In terms of hardware, FIG. 11 is a schematic diagram illustrating hardware of an electronic device where the blockchain-based billing apparatus is located in the present specification. In addition to a processor, a memory, a network interface, and a nonvolatile memory that are shown in FIG. 11, the electronic device where the apparatus is located in the implementation can usually further include other hardware based on actual functions of the blockchain-based billing apparatus. Details are omitted here for simplicity.

Figure 12:
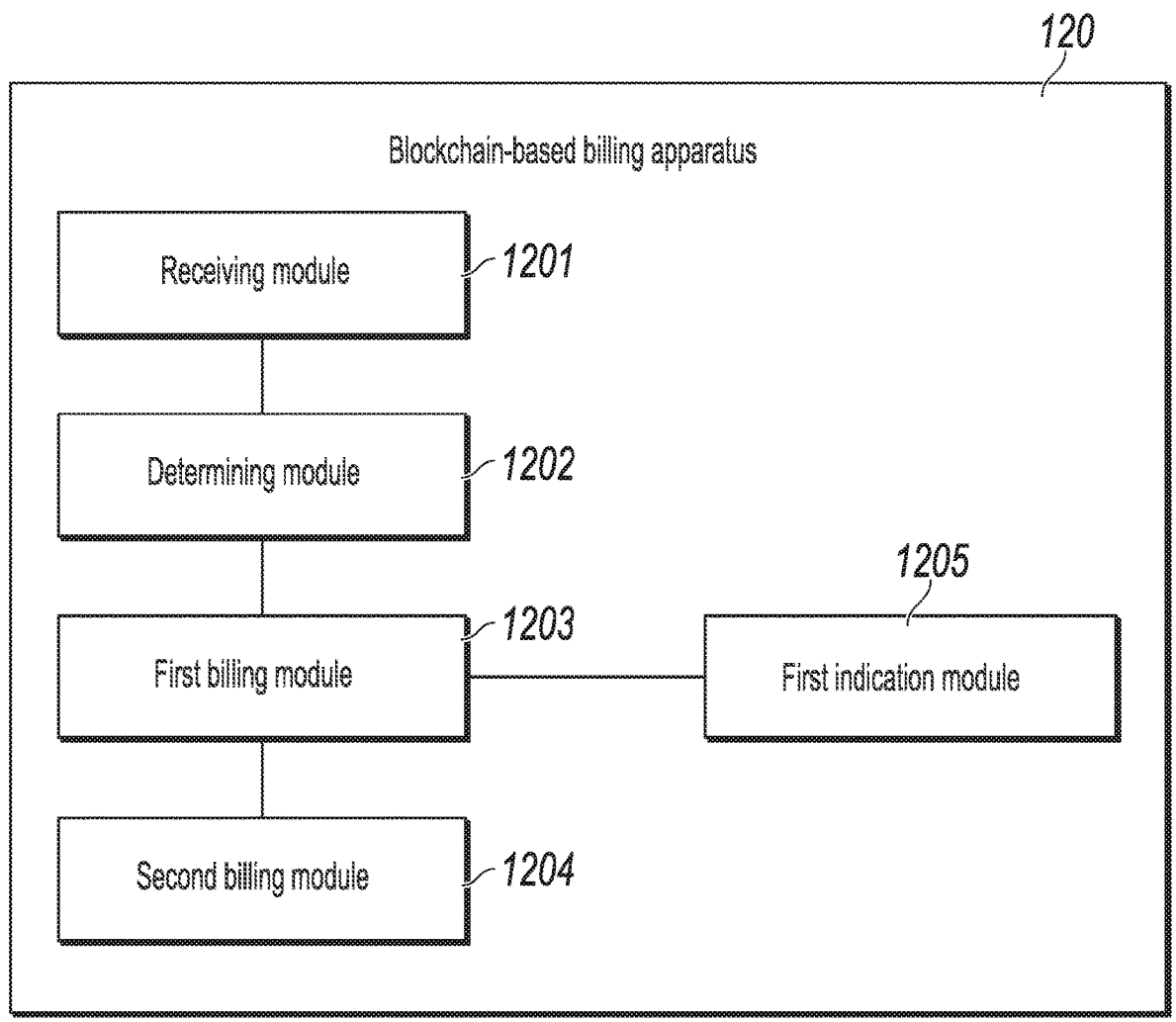
FIG. 12 is a block diagram illustrating a blockchain-based billing apparatus, according to an example implementation of the present specification.

FIG. 12 is a block diagram illustrating a blockchain-based billing apparatus, according to an example implementation of the present specification. Apparatus 120 is applicable to the electronic device shown in FIG. 11, and the electronic device can join the blockchain as a node device. The blockchain includes multiple levels of accounts used to maintain e-bill number segments. The apparatus 120 can include: receiving module 1201, configured to receive a billing transaction published to the blockchain, where the billing transaction includes billing information and an account identifier of an account of a biller; determining module 1202, configured to invoke a smart contract deployed on the blockchain in response to the billing transaction, to determine whether a quantity corresponding to an e-bill number segment maintained in the account of the biller is sufficient; and first billing module 1203, configured to: if the quantity corresponding to the e-bill number segment maintained in the account of the biller is insufficient, allocate e-bill numbers to the biller from an e-bill number segment maintained in an upper-level account corresponding to the account of the biller, and add the e-bill numbers allocated to the biller to the account of the biller for maintenance; and allocate a target e-bill number to the biller from the e-bill numbers allocated to the account of the biller, and create an e-bill based on the target e-bill number and the billing information.

In this implementation, apparatus 120 can further include: second billing module 1204, configured to: if the quantity corresponding to the e-bill number segment maintained in the account of the biller is sufficient, allocate a target e-bill number to the biller from the e-bill number segment maintained in the account of the biller, and create an e-bill based on the target e-bill number and the billing information.

In this implementation, first billing module 1203 can be configured to: determine whether a quantity corresponding to the e-bill number segment maintained in the upper-level account corresponding to the account of the biller is sufficient; and if the quantity corresponding to the e-bill number segment maintained in the upper-level account is sufficient, allocate the e-bill numbers to the biller from the e-bill number segment maintained in the upper-level account.

In this implementation, apparatus 120 can further include: indication module 1205, configured to: if the quantity corresponding to the e-bill number segment maintained in the upper-level account is insufficient, send an alarm indication to a client corresponding to the upper-level account, to instruct the client to construct a number application transaction and publish the number application transaction to the blockchain; or if the quantity corresponding to the e-bill number segment maintained in the upper-level account is insufficient, generate event information that the quantity corresponding to the e-bill number segment maintained in the upper-level account is insufficient, and publish the event information to the blockchain for storage, so that when detecting the event information through listening, a client corresponding to the upper-level account constructs a number application transaction and publishes the number application transaction to the blockchain.

For an implementation process of functions of each module in the apparatus, references can be made to an implementation process of a corresponding step in the previous method. Details are omitted here for simplicity.

Because an apparatus implementation basically corresponds to a method implementation, for related parts, references can be made to some descriptions in the method implementation. The previously described apparatus implementation is only an example. The modules described as separate parts may or may not be physically separate, and parts displayed as modules may or may not be physical modules, that is, may be located in one position, or may be distributed on a plurality of network modules. Some or all of the modules can be selected based on actual demands to achieve the objectives of the solutions of the present specification. A person of ordinary skill in the art can understand and implement the implementations of the present application without creative efforts.

The system, apparatus, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

In a typical configuration, the computer includes one or more processors (CPUs), input/output interfaces, network interfaces, and memories.

The memory may include a non-persistent memory, a random access memory (RAM), and/or a nonvolatile memory in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, a quantum memory or a Graphene-based storage medium, another magnetic storage device, or any other non-transmission medium. The computer storage medium can be configured to store information accessible to a computing device. As defined in the present application, the computer-readable medium does not include computer-readable transitory media such as a modulated data signal and a carrier.

It is worthwhile to further note that, the terms "include" and "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

Specific implementations of the present application are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require the shown particular execution order to achieve the desired results. In some implementations, multi-tasking and parallel processing can be or may be advantageous.

The terms used in the one or more implementations of the present specification are only intended to describe a particular implementation, but are not intended to limit the one or more implementations of the present specification. The terms "a" and "the" of singular forms used in the one or more implantations of the present application and the appended claims are also intended to include plural forms, unless otherwise specified in the context clearly. It is worthwhile to further understand that the term "and/or" used in the present specification indicates and includes any possible combination or all possible combinations of one or more associated listed items.

It is worthwhile to understand that although terms "first", "second", "third", etc. may be used in the one or more implementations of the present specification to describe various types of information, the information is not limited to the terms. These terms are only used to distinguish between information of the same type. For example, without departing from the scope of the one or more implementations of the present specification, first information can also be referred to as second information, and similarly, second information can also be referred to as first information. Depending on the context, for example, the word "if" used here can be explained as "while", "when", or "in response to determining".

The previous descriptions are only example implementations of the one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method, comprising:
receiving, by a node device in a blockchain, an e-bill number application transaction published to the blockchain, wherein the e-bill number application transaction comprises an account identifier of an account of a number applicant applying for e-bill numbers, the e-bill numbers are unique identifiers of respective e-bills, the blockchain comprises a plurality levels of accounts for maintaining respective e-bill number segments, each of the respective e-bill number segments comprises one or more e-bill numbers corresponding to the respective e-bills, and an e-bill number segment maintained by an account is a portion of an e-bill number segment maintained in an upper-level account corresponding to the account;
in response to the e-bill number application transaction, allocating, by the node device in the blockchain, one or more e-bill numbers to the number applicant from an e-bill number segment maintained in an upper-level account corresponding to the account of the number applicant, wherein the allocating one or more e-bill numbers to the number applicant from the e-bill number segment maintained in the upper-level account comprises:
determining whether a quantity corresponding to an e-bill number segment maintained in the account of the number applicant is sufficient;
in response to determining that the quantity corresponding to the e-bill number segment maintained in the account of the number applicant is sufficient, allocating to the number applicant the one or more e-bill numbers from the e-bill number segment maintained in the account of the number applicant, wherein the one or more e-bill numbers from the e-bill number segment maintained in the account of the number applicant are a subset of one or more e-bill numbers from the e-bill number segment maintained in the upper-level account corresponding to the account of the number applicant;
in response to determining that the quantity corresponding to the e-bill number segment maintained in the account of the number applicant is insufficient, applying for the one or more e-bill numbers from the e-bill number segment maintained in the upper-level account corresponding to the account of the number applicant; and adding, by the node device in the blockchain, the one or more e-bill numbers allocated to the number applicant to the account of the number applicant for maintenance.

2. The computer-implemented method of claim 1, wherein the allocating one or more e-bill numbers to the number applicant from an e-bill number segment maintained in an upper-level account corresponding to the account of the number applicant comprises:
invoking a smart contract deployed on the blockchain to allocate the one or more e-bill numbers to the number applicant from the e-bill number segment maintained in the upper-level account corresponding to the account of the number applicant.

3. The computer-implemented method of claim 1, further comprising:
further in response to determining that the quantity corresponding to the e-bill number segment maintained in the upper-level account is insufficient, sending an alarm indication to a client device corresponding to the upper-level account.

4. The computer-implemented method of claim 1, further comprising:
further in response to determining that the quantity corresponding to the e-bill number segment maintained in the upper-level account is insufficient, generating event information that the quantity corresponding to the e-bill number segment maintained in the upper-level account is insufficient, and publishing the event information to the block chain for storage, wherein the event information causes a client device corresponding to the upper-level account to construct a third e-bill number application transaction and publish the third e-bill number application transaction to the blockchain.

5. The computer-implemented method of claim 1, further comprising:
periodically determining whether a quantity corresponding to an e-bill number segment maintained in each level of account in the plurality levels of accounts is sufficient; and
if a quantity corresponding to an e-bill number segment maintained in a level of a target account in the plurality levels of accounts is insufficient, sending an alarm indication to a client device corresponding to the target account to instruct the client device to construct a fourth e-bill number application transaction and publish the fourth e-bill number application transaction to the blockchain.

6. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations, comprising:
receiving, by a node device in a blockchain, an e-bill number application transaction published to the blockchain, wherein the e-bill number application transaction comprises an account identifier of an account of a number applicant applying for e-bill numbers, the e-bill numbers are unique identifiers of respective e-bills, the blockchain comprises a plurality levels of accounts for maintaining respective e-bill number segments, each of the respective e-bill number segments comprises one or more e-bill numbers corresponding to the respective e-bills, and an e-bill number segment maintained by an account is a portion of an e-bill number segment maintained in an upper-level account corresponding to the account;
in response to the e-bill number application transaction, allocating, by the node device in the blockchain, one or more e-bill numbers to the number applicant from an e-bill number segment maintained in an upper-level account corresponding to the account of the number applicant, wherein the allocating one or more e-bill numbers to the number applicant from the e-bill number segment maintained in the upper-level account comprises:
determining whether a quantity corresponding to an e-bill number segment maintained in the account of the number applicant is sufficient;
in response to determining that the quantity corresponding to the e-bill number segment maintained in the account of the number applicant is sufficient, allocating to the number applicant the one or more e-bill numbers from the e-bill number segment maintained in the account of the number applicant, wherein the one or more e-bill numbers from the e-bill number segment maintained in the account of the number applicant are a subset of one or more e-bill numbers from the e-bill number segment maintained in the upper-level account corresponding to the account of the number applicant;
in response to determining that the quantity corresponding to the e-bill number segment maintained in the account of the number applicant is insufficient, applying for the one or more e-bill numbers from the e-bill number segment maintained in the upper-level account corresponding to the account of the number applicant; and
adding, by the node device in the blockchain, the one or more e-bill numbers allocated to the number applicant to the account of the number applicant for maintenance.

7. The computer-implemented system of claim 6, wherein the allocating one or more e-bill numbers to the number applicant from an e-bill number segment maintained in an upper-level account corresponding to the account of the number applicant comprises:
invoking a smart contract deployed on the blockchain to allocate the one or more e-bill numbers to the number applicant from the e-bill number segment maintained in the upper-level account corresponding to the account of the number applicant.

8. The computer-implemented system of claim 6, wherein the operations further comprise:
further in response to determining that the quantity corresponding to the e-bill number segment maintained in the upper-level account is insufficient, sending an alarm indication to a client device corresponding to the upper-level account.

9. The computer-implemented system of claim 6, wherein the operations further comprise:
further in response to determining that the quantity corresponding to the e-bill number segment maintained in the upper-level account is insufficient, generating event information that the quantity corresponding to the e-bill number segment maintained in the upper-level account is insufficient, and publishing the event information to the blockchain for storage, wherein the event information causes a client device corresponding to the upper-level account to construct a third e-bill number application transaction and publish the third e-bill number application transaction to the blockchain.

10. The computer-implemented system of claim 6, wherein the operations further comprise:
periodically determining whether a quantity corresponding to an e-bill number segment maintained in each level of account in the plurality levels of accounts is sufficient; and
if a quantity corresponding to an e-bill number segment maintained in a level of a target account in the plurality levels of accounts is insufficient, sending an alarm indication to a client device corresponding to the target account to instruct the client device to construct a fourth e-bill number application transaction and publish the fourth e-bill number application transaction to the blockchain.

11. A non-transitory, computer-readable medium storing one or more instructions executable by a computer system to perform operations, comprising:
receiving, by a node device in a blockchain, an e-bill number application transaction published to the blockchain, wherein the e-bill number application transaction comprises an account identifier of an account of a number applicant applying for e-bill numbers, the e-bill numbers are unique identifiers of respective e-bills, the blockchain comprises a plurality levels of accounts for maintaining respective e-bill number segments, each of the respective e-bill number segments comprises one or more e-bill numbers corresponding to the respective e-bills, and an e-bill number segment maintained by an account is a portion of an e-bill number segment maintained in an upper-level account corresponding to the account;
in response to the e-bill number application transaction, allocating, by the node device in the blockchain, one or more e-bill numbers to the number applicant from an e-bill number segment maintained in an upper-level account corresponding to the account of the number applicant, wherein the allocating one or more e-bill numbers to the number applicant from the e-bill number segment maintained in the upper-level account comprises:
determining whether a quantity corresponding to an e-bill number segment maintained in the account of the number applicant is sufficient;
in response to determining that the quantity corresponding to the e-bill number segment maintained in the account of the number applicant is sufficient, allocating to the number applicant the one or more e-bill numbers from the e-bill number segment maintained in the account of the number applicant, wherein the one or more e-bill numbers from the e-bill number segment maintained in the account of the number applicant are a subset of one or more e-bill numbers from the e-bill number segment maintained in the upper-level account corresponding to the account of the number applicant;
in response to determining that the quantity corresponding to the e-bill number segment maintained in the account of the number applicant is insufficient, applying for the one or more e-bill numbers from the e-bill number segment maintained in the upper-level account corresponding to the account of the number applicant; and
adding, by the node device in the blockchain, the one or more e-bill numbers allocated to the number applicant to the account of the number applicant for maintenance.

12. The non-transitory, computer-readable medium of claim 11, wherein the allocating one or more e-bill numbers to the number applicant from an e-bill number segment maintained in an upper-level account corresponding to the account of the number applicant comprises:
invoking a smart contract deployed on the blockchain to allocate the one or more e-bill numbers to the number applicant from the e-bill number segment maintained in the upper-level account corresponding to the account of the number applicant.

13. The non-transitory, computer-readable medium of claim 11, wherein the operations further comprise:
further in response to determining that the quantity corresponding to the e-bill number segment maintained in the upper-level account is insufficient, sending an alarm indication to a client device corresponding to the upper-level account.

14. The non-transitory, computer-readable medium of claim 11, wherein the operations further comprise:
further in response to determining that the quantity corresponding to the e-bill number segment maintained in the upper-level account is insufficient, generating event information that the quantity corresponding to the e-bill number segment maintained in the upper-level account is insufficient, and publishing the event information to the blockchain for storage, wherein the event information causes a client device corresponding to the upper-level account to construct a third e-bill number application transaction and publish the third e-bill number application transaction to the blockchain.

15. The non-transitory, computer-readable medium of claim 11, wherein the operations further comprise:
periodically determining whether a quantity corresponding to an e-bill number segment maintained in each level of account in the plurality levels of accounts is sufficient; and
if a quantity corresponding to an e-bill number segment maintained in a level of a target account in the plurality levels of accounts is insufficient, sending an alarm indication to a client device corresponding to the target account to instruct the client device to construct a fourth e-bill number application transaction and publish the fourth e-bill number application transaction to the blockchain.

* * * * *

UNITED STATES PATENT AND TRADEMARK OFFICE
CERTIFICATE OF CORRECTION

PATENT NO. : 10,846,765 B2  
APPLICATION NO. : 16/779198  
DATED : November 24, 2020  
INVENTOR(S) : Zhen Sun et al.

Page 1 of 1

It is certified that error appears in the above-identified patent and that said Letters Patent is hereby corrected as shown below:

In the Claims

Claim 4, Column 31, Line 30, delete "block chain" and insert -- blockchain --, therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*